(12) United States Patent
Etori

(10) Patent No.: US 7,320,535 B2
(45) Date of Patent: Jan. 22, 2008

(54) LIGHT CONTROL FILM

(75) Inventor: Hideki Etori, Saitama (JP)

(73) Assignee: Kimoto Co., Ltd., Tokyo (JP)

( * ) Notice: Subject to any disclaimer, the term of this patent is extended or adjusted under 35 U.S.C. 154(b) by 21 days.

(21) Appl. No.: 10/525,722

(22) PCT Filed: Aug. 28, 2003

(86) PCT No.: PCT/JP03/10927

§ 371 (c)(1),
(2), (4) Date: Feb. 28, 2005

(87) PCT Pub. No.: WO2004/021052

PCT Pub. Date: Mar. 11, 2004

(65) Prior Publication Data

US 2005/0243561 A1 Nov. 3, 2005

(30) Foreign Application Priority Data

Aug. 30, 2002 (JP) ............................. 2002-254144
Feb. 26, 2003 (JP) ............................. 2003-049533
Aug. 4, 2003 (JP) ............................. 2003-286160

(51) Int. Cl.
*F21V 5/04* (2006.01)

(52) U.S. Cl. ...................... 362/335; 362/606; 362/607; 362/618; 362/619

(58) Field of Classification Search ................ 362/331, 362/339, 337, 606, 607, 618, 619, 335
See application file for complete search history.

(56) References Cited

U.S. PATENT DOCUMENTS

| | | | |
|---|---|---|---|
| 6,505,959 B2 * | 1/2003 | Masaki et al. | 362/339 |
| 6,608,722 B2 * | 8/2003 | Cowan et al. | 359/599 |
| 6,846,098 B2 * | 1/2005 | Bourdelais et al. | 362/330 |
| 6,898,012 B2 * | 5/2005 | Kaminsky et al. | 359/599 |

\* cited by examiner

*Primary Examiner*—Stephen F Husar
*Assistant Examiner*—Meghan K. Dunwiddie
(74) *Attorney, Agent, or Firm*—Bacon & Thomas, PLLC

(57) ABSTRACT

A light control film having a refractive index n and an uneven, irregular surface pattern provides a reasonable level of light diffusion without a glare problem provided, for any cross-section perpendicular to the base plane of the film, the average of absolute values of slope $\theta_{ave}$ of a curve along the edge of the cross-section contoured by the rough surface pattern (profile curve) is at least $78-34n$ degrees and no higher than $118-34n$ degrees, or the average of absolute values of slope $\theta_{ave}$ of a profile curve to the length L1 of a straight line defined by the intersection of the base plane and the cross-section satisfies the following formula (3) or (4) for substantially all cross-sections.

$$\theta_{ave} \div Lr \times n^2 \geq 40 \quad (3)$$

$$50 \leq \theta_{ave} \times Lr \times n^2 \leq 135 \quad (4)$$

6 Claims, 11 Drawing Sheets

FIG. 4
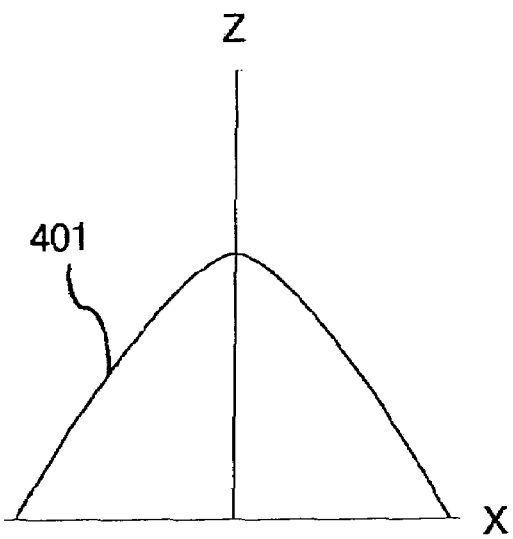
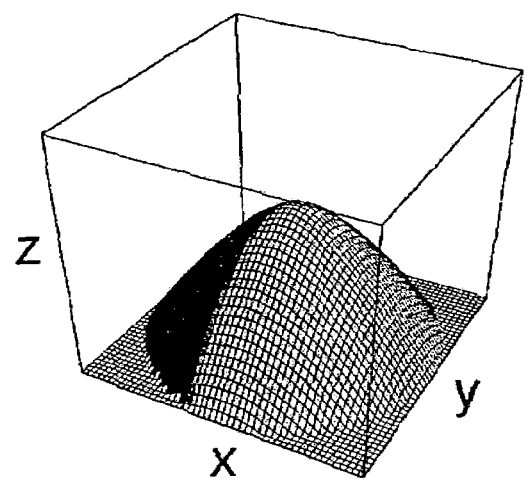
FIG. 5
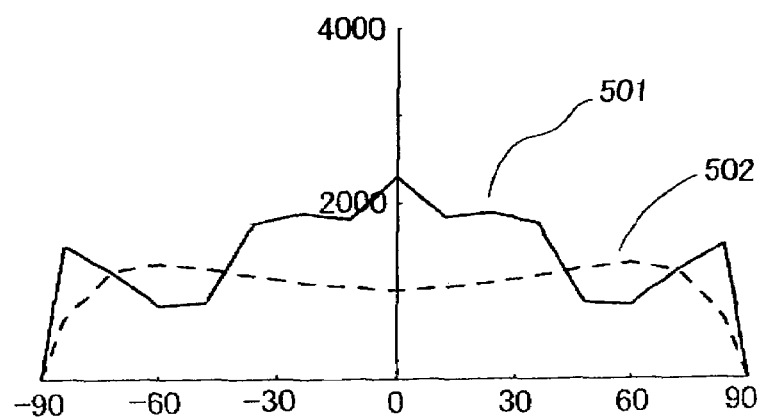

Base Plane

Profile curve

Perpendicular cross section

FIG. 16
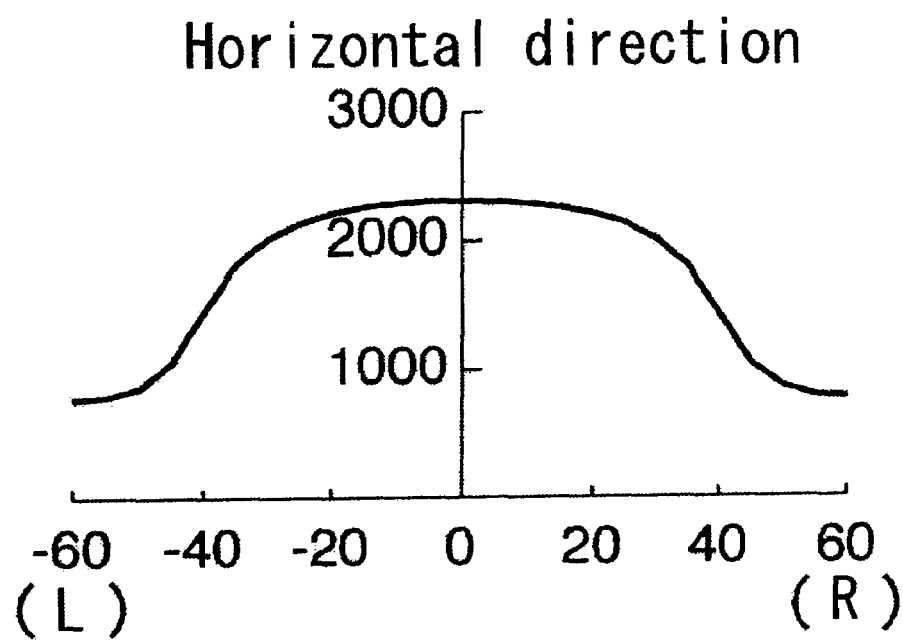
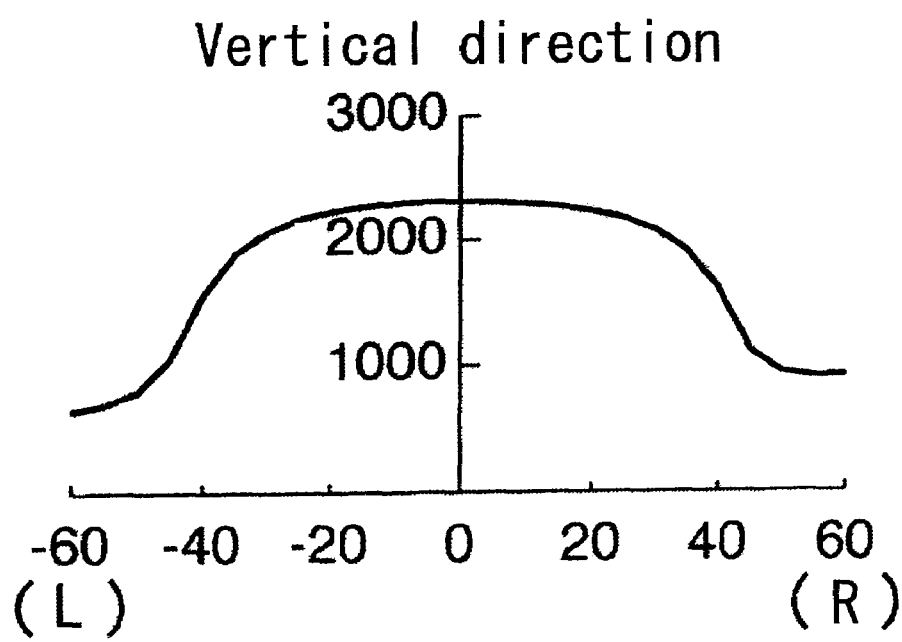

FIG. 17
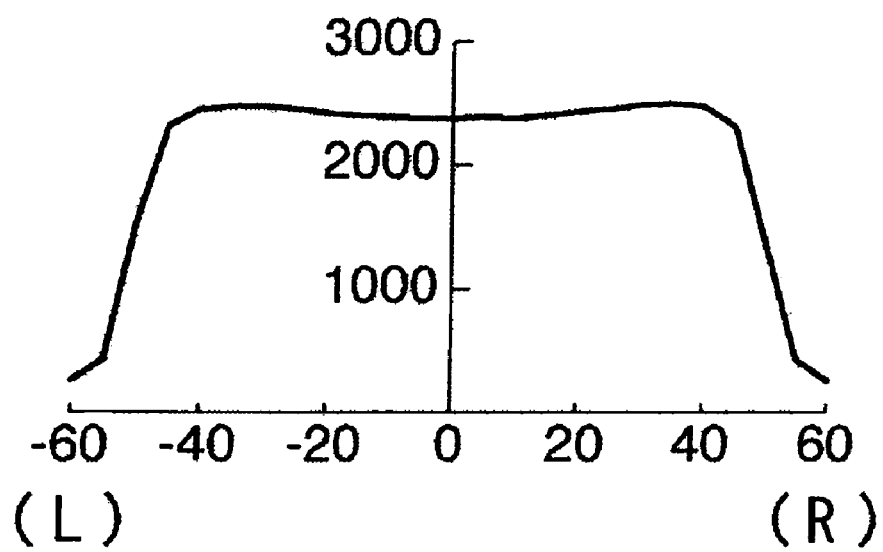
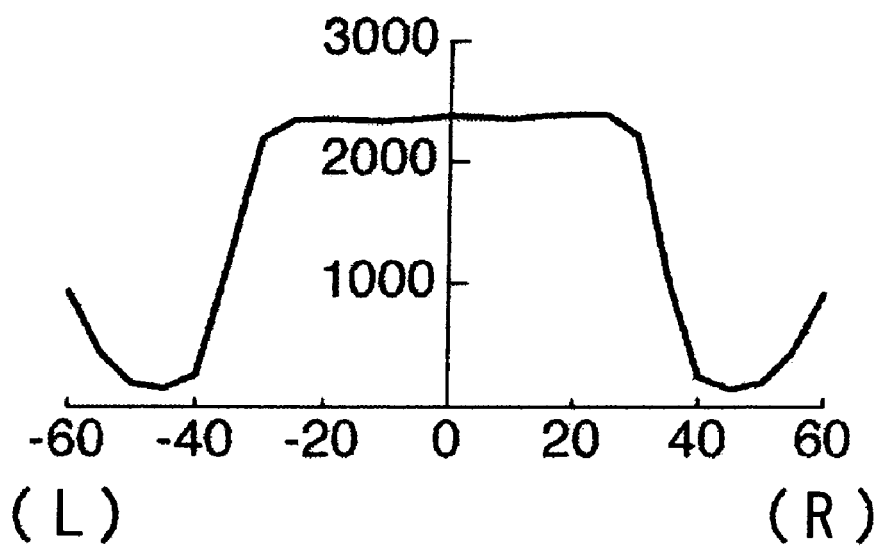

LIGHT CONTROL FILM

FIELD OF THE INVENTION

The present invention relates to a light control film used for a backlight of liquid crystal displays etc., and a backlight using the same.

RELATED ART

A backlight of an edge-light, in which a light source is located at least on one end of a light guiding plate, is widely used as a backlight for liquid crystal displays etc. An edge-light backlight has such advantage that the thickness of the backlight itself can be reduced. However, as a light source is located on the edge, an emergent light contains much components leaning greatly away from the front direction, thereby making it difficult to attain a high front luminance. In conventional backlights, a plural number of optical films and light diffusion films, including prism sheet, are used in combination in order to orient the emergent light to the front, and thus to improve a front luminance (Examples: The Japanese Patent Application Laid-Open No. 8-55507 and the Japanese Patent Application Laid-Open No. 2000-352607 etc.).

However, such backlight, in which multiple sheets of optical films are incorporated, had difficulties in reducing the thickness and lowering the cost, and was faced by unfavorable problems such as generation of the Newton rings attributable to the lamination of multiple optical films and scars caused by the contact of films.

On the other hand, prism sheets and lens sheets are widely used as a light control film for controlling the direction of an emergent light. However, since these optical films are expensive in general, a light control film has been developed as an alternative, offering various proposals on the surface geometry and rough surface (unevenness) patterns of the film. For example, Japanese Patent Application Laid-Open No. 4-146401 proposes a material with irregular rough surface patterns, which are produced by combining sawtooth elements of various sizes, as a controlling material to be used in combination with light diffusion material. The Japanese Patent Application Laid-Open 05-169015 also proposes a light diffusion sheet, in which many optical elements of certain shape, such as hemispheric, conical or prismatic shape, are regularly arranged in a certain pitch.

However, although the conventional light control films containing prism sheet or lens sheet can be designed based on geometrical optics for increasing the ratio of the light emerging towards the front (the plane orthogonally crossing the film surface), regularly arranged protrusions are likely to generate interference patterns, thus causing glare and poor visibility when this film is used alone. While solving these disadvantages requires the use of light diffusion sheets etc., together with a light diffusion film, the use may cause above-mentioned problems attributable to the lamination of the films and the reduced luminance in general.

Further, if an irregularly uneven surface is produced by the combination of sawtooth elements of various sizes as in a controlling material described in the Japanese Patent Application Laid-Open No. 4-146401, it is not easy to provide uniform characteristics such as higher luminance and less glare over the entire film surface.

Accordingly, an object of the present invention is to provide a light control film, which has an improved front luminance and a proper amount of diffusiveness and has no glare problem when it is used alone or in combination with a small number of optical films. Further, another object is to provide a light control film without dispersion (variance) of the characteristics.

DISCLOSURE OF THE INVENTION

The inventor of the present invention conducted various studies, to achieve the foregoing object, on various factors which define the surface geometry of a light control film, including the geometry of surface roughness, slope to the film surface (base plane), height and pitch of protrusion and recess, etc. As a result, he found that an incident light could be effectively oriented towards the front direction of the film (emergent direction) by appropriately controlling the slope of the rough surface patterns to the film surface, and that the front luminance could be improved by the use of a fewer number of optical films. More specifically, he found that, as shown in FIG. 1, excellent front luminance could be achieved when the average of the absolute value of slope ($\theta_{ave}$) of a curve (profile curve) 101 contouring the edge of the cross section 100, which is a cross section in any direction perpendicular to the film surface (the surface opposite to the surface with the rough surface patterns), is within a certain range. Further, he found that by using the average of absolute values of slope ($\theta_{ave}$) (degree) of the profile curve 101 as an indicator of the slope of the unevenness and the ratio (Lr=L2/L1) of the length of the profile curve (L2) to the length (L1) of the straight line 102 determined by an intersection of the film surface and the cross section as an indicator of the height of the unevenness, changes in the front luminance could be described by a particular formula expressing a correlation with the indicators and that the excellent front luminance could be achieved when this value is within a certain range. Thus, he accomplished the present invention.

In other words, the light control film of this invention is the light control film having rough surface patterns, wherein regarding any cross section perpendicular to the base plane of the film, an average of absolute values of slope ($\theta_{ave}$ (degree)) of a curve along the edge of the cross section contoured by the rough surface (the curve is referred as a profile curve hereinafter) to said base plane is 20 degree or higher and 75 degree or lower over substantially all cross sections. (Hereinafter, the slope of a profile curve for the rough surface patterns at $20 \leq \theta_{ave} \leq 75$ is defined as Condition 1)

Further, the light control film of the present invention is the light control film having a rough surface patterned layer made of material with a particular refractive index n, wherein regarding any cross section perpendicular to the base plane of the film, an average of absolute values of slope ($\theta_{ave}$(degree)) of a curve along the edge of the profile contoured by the rough surface pattern (profile curve) to said base plane is 78-34 n degree or higher and 118-34 n degree or lower (Hereinafter, the slope of a profile curve for the rough surface pattern at $(78-34\ n) \leq \theta_{ave} \leq (118-34\ n)$ is defined as Condition 2).

In the light control film of the present invention, the difference of the average of absolute values of slope of the profile curve, depending on the direction of the profile including the profile curve, is preferably 30 degrees or less.

Further, the light control film of this invention is the light control film having rough surface patterns, wherein regarding any cross section perpendicular to the base plane of the film, an average of absolute values of slope ($\theta_{ave}$(degree)) of a curve of the edge of the profile contoured by the rough surface patterns (profile curve) to said base plane and the ratio (Lr=L2/L1) of the length of said profile curve (L2) to the length (L1) of the straight line determined by an intersection of said base plane and the cross section satisfy, over substantially all cross sections, Formula (1) or Formula (2) as described below (Hereinafter, the condition to satisfy Formula (1) or Formula (2) is defined as Condition (3).

$$\theta_{ave} \div Lr \geq 20 \quad (1)$$

$$25 \leq \theta_{ave} \times Lr \leq 60 \quad (2)$$

The light control film of this invention is the light control film having a rough surface patterned layer made of material with a certain refraction index n, wherein regarding any cross section perpendicular to the base plane of the film, an average of absolute values of slope ($\theta_{ave}$(degree)) of a curve along the edge of the profile contoured by the rough surface pattern (profile curve) to said base plane and the ratio (Lr=L2/L1) of the length of said profile curve (L2) to the length (L1) of the straight line determined by an intersection of said base plane and the cross section satisfy, over substantially all cross sections, Formula (3) or Formula (4) as described below (Hereinafter, the condition for the slope of the profile curve of the rough surface pattern to satisfy Formula (3) or Formula (4) is defined as Condition 4).

$$\theta_{ave} \div Lr \times n^2 \geq 40 \quad (3)$$

$$50 \leq \theta_{ave} \times Lr \times n^2 \leq 135 \quad (4)$$

In this invention, the base plane of the film means the surface thereof, if the film is deemed as substantially flat surface, whereas if the surface opposite to the surface with the rough surface pattern of the light control film of this present invention is a smooth surface, this smooth surface is deemed as a base plane. Further, if this opposite surface is uneven rather than smooth, the surface including a centerline of these two different directions can be deemed as a base plane.

Such slope of a profile curve to the base plane can be obtained generally as f'(x) by differentiating f(x) by x, where the profile curve y is expressed as y=f(x), while the average ($S_{ave}$) of its absolute values is expressed by the undermentioned Formula (5), where the length of the section for which the abovementioned value is calculated is defined as L. The average of absolute values of slope ($\theta_{ave}$) expressed in angle can be expresses by the Formula (6) below.

$$S_{av} = \frac{1}{L} \int_0^L |f'(x)| dx \quad (5)$$

$$\theta_{av} = \frac{1}{L} \int_0^L |\tan^{-1} f'(x)| dx \quad (6)$$

Although these functions can be used in product design, it is difficult to express a profile curve for actual products with a general function, and to obtain the average of absolute values of slope. Therefore, in this present invention, the value obtained as described below is defined as an average of absolute values of slope of a profile curve.

First of all, a profile curve is measured, by using a surface profiler, from any point on the surface with rough surface patterns in any direction. Measurement results are composed of height data of the surface ($h(d_1)$, $h(d_2)$, $h(d_3)$ ... $h(d_m)$) measured at the points arranged at particular intervals ($\Delta d$) in a cross sectional direction ($d_1, d_2, d_3 \ldots, d_m$). For example, these data are expressed in a graph, where the height of the rough surface pattern and the direction of a profile curve are displayed on the vertical and horizontal axis, respectively, as shown in FIG. 2. The segments of the profile curve divided by an interval (Examples: (a-b), (c-d) ... ) can be deemed as a straight line if the interval is sufficiently short, where the absolute value of slope $\theta i$ (i=1, 2, 3 ... m) (Unit: degree) can be expressed with the following formula.

$$\theta i = \tan^{-1}\{[h(d_i) - h(d_{i-1})]/\Delta d\} \quad (7)$$

The average of the abovementioned slope obtained for all segments of the profile curve divided by a certain interval ($\Delta d$) is defined as the average of absolute values of slope, $\theta_{ave}$.

$$\theta_{ave} = \frac{1}{m} \sum_{i=1}^{m} |\theta_i| \quad (8)$$

The length of the abovementioned interval ($\Delta d$) is long enough to be able to accurately reflect the geometry of the rough surface pattern contained in the profile curve, specifically about 1.0 μm long or less. Further, the level of preciseness differs depending on a surface profiler used in the measurement of the profile of the film having rough surface patterns. In the light control film of this present invention, Conditions 1 and 2 are applied to the figures obtained by using a stylus profiler. As it is considered that the effect of measurement device used can be removed by operation on measurement values, Conditions 3 and 4 are applied regardless of the measurement device.

In the light control film having such a rough surface pattern of this present invention, of the light entering from the opposite onto the surface with such a rough surface pattern and emerging from the surface with the rough surface pattern, the components within the emergent angle ranging from 0 to 30 degrees can be increased, thereby attaining the front luminance that is equal to or higher than that attained by a prism sheet. Moreover, said light control film has a proper amount of light diffusiveness and generates neither glare nor interference patterns.

Further, the light control film of this present invention has the rough surface pattern satisfying either of the abovementioned Conditions 1-4, wherein the average of absolute values of slope ($\theta_{ave}$) of the profile curve increases gradually as its direction approaches from the first direction, which is parallel to the base plane of said light control film, to the second direction which is parallel to the base plane of said light control film and perpendicular to said first direction.

In this light control film, when it is located on a backlight such that the longitudinal direction of the light source of the backlight should be along the first direction, changes in angular dependence of luminance of backlight (hereinafter angular dependence of luminance) due to difference in the direction to the light source can be corrected to attain uniform luminance.

The light control film of this present invention has a rough surface pattern satisfying either of the aforementioned Conditions 1 to 4, wherein the slope of the profile curve to the base plane gradually increases or decreases when approaching from one end to the other end of the film.

In this light control film, when the side of a light source of a backlight is located to represent an end of the film, changes in angular dependence of luminance due to difference in the distance from the light source can be corrected to attain uniform luminance.

The backlight device of this present invention is the backlight device using the aforementioned light control film of this present invention. Specifically, this backlight device is a backlight device comprising a light guiding plate, which has a light source at least on one end and a light emergent surface almost orthogonally crossing said end, and a light control film located on the light emergent surface of said light guiding plate, or a backlight device comprising a light control film, a light diffusion material and a light source on the side opposite to the light emergent surface of the light control film, in this order.

According to this present invention, a light control film having a high front luminance and a proper amount of light diffusiveness can be provided. Further, the backlight device of this present invention can minimize, by the use of such light control film, other materials to be used in combination with this film, thereby reducing the thickness of the backlight device. It can also control the occurrence of interference patterns and the generation of scars due to contact of films.

BRIEF DESCRIPTION OF THE DRAWINGS

FIG. 4 shows an example of a 3-dimensional rough surface pattern used for simulating differences in emergent angle characteristics according to the pattern.

FIG. 5 shows the result of 3-dimensional simulation.

FIG. 13 is a perspective view showing an example of rough surface patterns of a light control film of this invention.

FIG. 16 shows a luminance distribution of a light control film according to an embodiment of this invention.

FIG. 17 shows a luminance distribution of a light control film of the comparative example.

PREFERRED EMBODIMENT OF THE INVENTION

Figure 1:
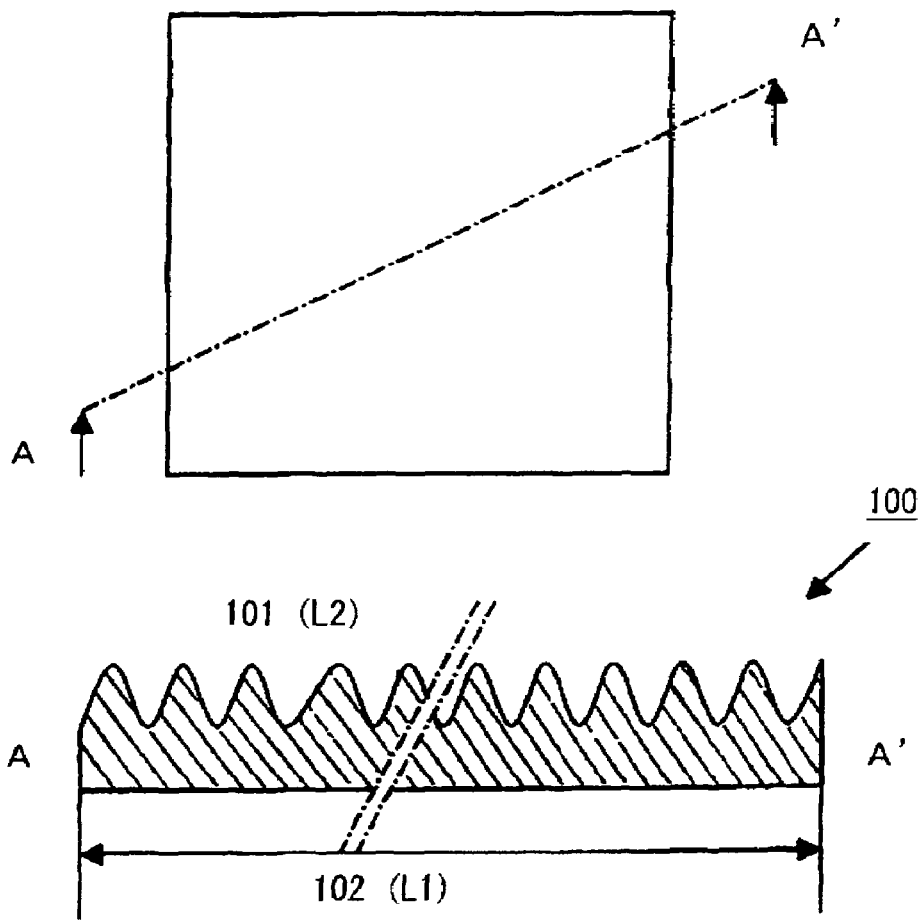
FIG. 1 shows illustrative views of a rough surface pattern of the light control film of this invention.
Figure 2:
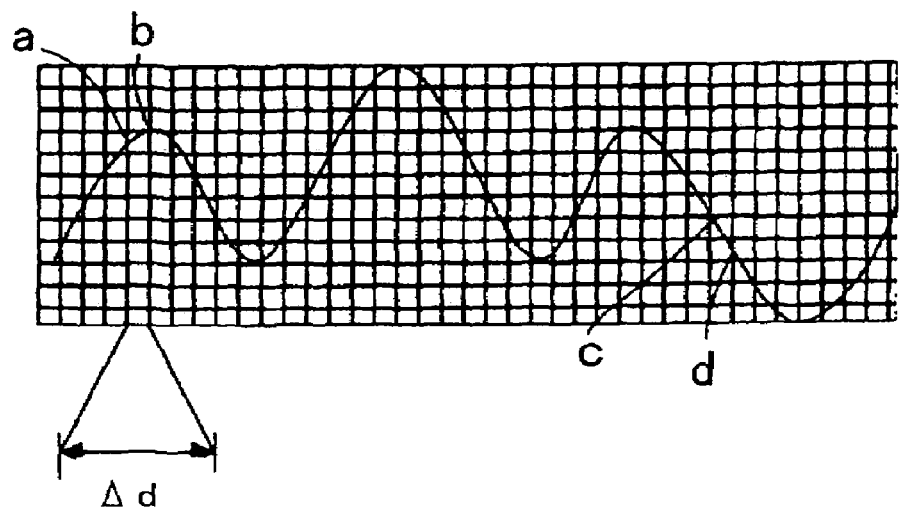
FIG. 2 is an illustrative view of a profile curve of the light control film of this invention.

The light control film and the backlight device of this invention will be explained in detail with reference to drawings. Sizes (thickness, width, height etc.) of each component in the drawings used for explaining the present invention have been enlarged or reduced in line with the requirements for explanation, and do not reflect exact size of each component of an actual light control film and a backlight device.

Figure 3:
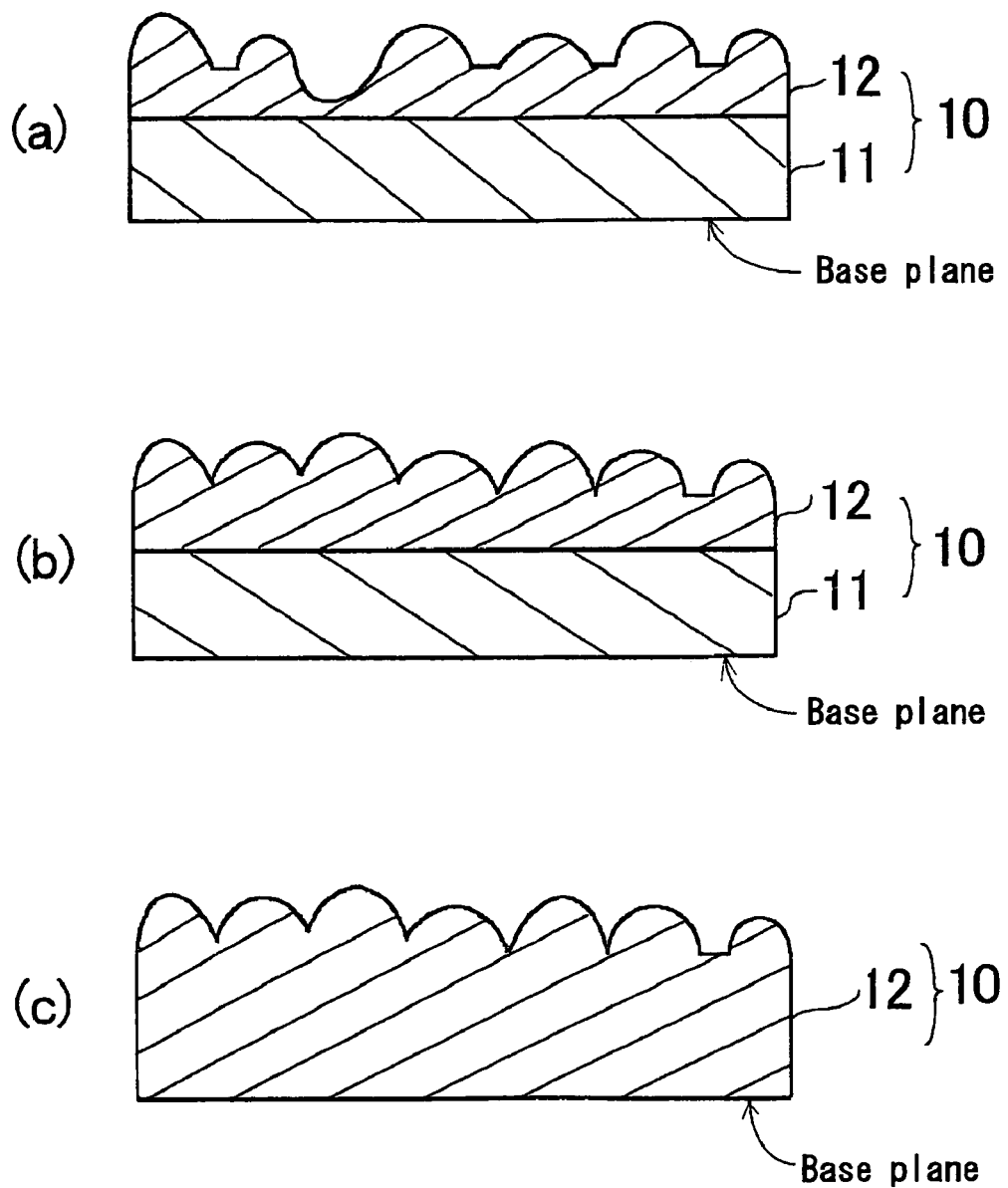
FIG. 3 illustrates cross sectional views of the light control films according to embodiments of this invention.

FIGS. 3(a)-3(c) are schematic views showing light control films 10 according to embodiments of the present invention. As illustrated in these figures, the light control film 10 of the present invention has a rough surface pattern made of fine protrusions and recesses on one side of an almost flat film, with distinctive characteristics in the geometry of this rough surface pattern. The rough surface pattern may be formed, as shown in FIG. (a) and FIG. (b), on a layer 12 formed on one side of the film used as a substrate 11. Alternatively, as shown in FIG. (C) the light control film may be comprised of only the layer 12, on which the rough surface pattern is formed.

The light control film of this invention controls the direction of incident light so that the component of the emergent light directing into a certain range of angles from the front when the light incident from the opposite side of the rough surface patterned surface emerges from the rough surface patterned surface increases, thereby enhancing the front luminance and providing light diffusiveness for preventing the occurrence of glare. The opposite side of the rough surface patterned surface is typically a smooth surface, but is not limited to a smooth surface. For example, the opposite surface can be matted or dot-patterned.

Conditions of the rough surface pattern for controlling the direction of light mentioned above will be explained.

Conditions 1 and 2

The inventor of the present invention firstly assumed a profile curve comprising multiple patterns of uniform protrusions for a segment of a certain length of a profile curve, then conducted simulation of the relationship between incident light and emergent light by changing the geometry and height of the pattern, the angle of incident light etc., and examined conditions for obtaining an optimal emergent light. In the simulation, it is assumed that, as incident and emergent lights, a light goes from one side of the profile curve to other side within the surface containing the profile curve, and a refraction index of 1.5, an index for ordinary acrylic resin, is used for one side and a refraction index of air for other side in calculation. Further, it is assumed that the distribution of incident lights is same with the distribution of emergent lights from a light guiding plate of an actual backlight (distribution of emergent lights passing through the center of a light guiding plate and orthogonally crosses the light source).

Such simulation revealed that by restricting the average of absolute values of slope (average slope) ($\theta_{ave}$(degree)) to a segment of a profile curve to 20 degrees or higher and 75 degree or lower, the light leaning greatly from the front direction could be effectively oriented to the front direction, thereby the front luminance could be improved. This average slope ($\theta_{ave}$(degree)) is preferably 25 degrees or higher and 60 degrees or lower, and more preferably 30 degrees or higher and 50 degree or lower, to obtain particularly excellent effects.

These conditions need to be satisfied for substantially all cross sections. "To be satisfied for substantially all cross sections" means that the condition needs to be satisfied for most of the cross sections of a particular light control film observed, but a few cases which contain one or two cross sections which do not satisfy the condition may be included. For example, said conditions may not be satisfied due to a fewer number of rough surface patterns (protrusions) for the cross section at the edge of the light control film, while it is considered that the conditions of this invention are satisfied if the aforementioned conditions are satisfied for a relatively long profile curve.

Meanwhile, the abovementioned simulation for identifying conditions to be satisfied by the rough surface pattern of this invention assumes a material whose refraction index on the incident side of the protrusion pattern is 1.5. However, the rough surface pattern of the light control film of this invention can be made with the material generally used in the optical film, without limiting its refraction index to 1.5. In the generalization by taking the refraction index n into account, abovementioned effects are obtained with the average slope ($\theta_{ave}$(degree)) is (78-34 n) degrees or higher and (118-34 n) degrees or lower.

By designing the geometry of the rough surface pattern taking account of the refraction index of the material with which the pattern is made, the luminance in the front direction can be further improved.

Conditions 3 and 4

Conditions 3 and 4 have been obtained based on the results of 3-dimensional simulation. In other words, the inventor of this invention simulated the relationship between incident light and emergent light by changing the shape and height of the pattern, the angle of the incident light etc., for a single protrusion pattern made of a rotating body, which is made by rotating around the axis z a curve 401 drawn on the surface orthogonally crossing the xy plane, as a base plane, as shown in FIG. 4, and examined the conditions for obtaining an optimal emergent light. Then, the distribution of lights emerging from the protrusion patterned side (angular characteristics of emergent light) when the light with the same distribution with that of the light emerging from a light guiding plate of an actual backlight enters from the bottom of this protrusion pattern was found by calculation. In the calculation, refraction index of 1.5, an index for common acrylic resin, was used as a refraction index n inside the protrusion pattern.

FIG. 5 shows the distribution 501 of emergent light, a result obtained by the simulation in respect of the pattern having the geometry shown in FIG. 4. A dotted line in FIG. 5 represents a distribution 502 of incident light. In order to attain good front luminance and a certain extent of light scattering, it is desirable that the emergent light contains a higher ratio of light components emerging into the range of ±30 degrees from the front (0 degree) and has high uniformity in the range of ±30 degrees from the front (0 degree).

Figure 6:
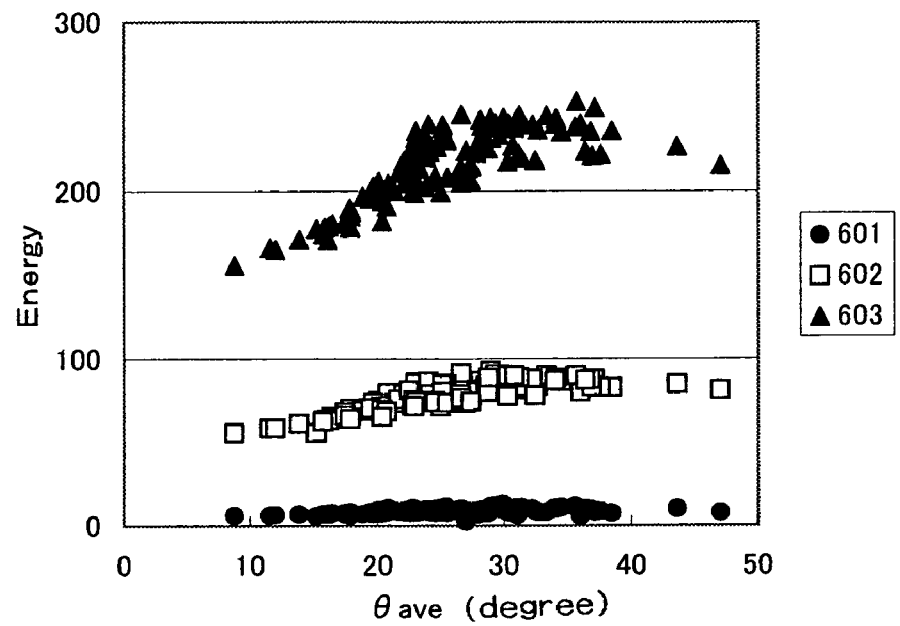
FIG. 6 shows the results of 3-dimensional simulation.

Then, in order to find conditions for obtaining the angular characteristics satisfying the above conditions with regard to the rough surface on which multiple protrusion patterns are formed, changes in the distribution of emergent light due to various changes made to the shapes and the height of the pattern was simulated with respect to the system having multiple abovementioned protrusion patterns. Results of the simulation are shown in FIG. 6, where a horizontal axis represents the average slope ($\theta_{ave}$) of the curve for the whole of the multiple protrusion patterns, and a vertical axis represents energy of emergent light. The first group 601 represents the emergent light within the range of 6 degrees around the axis z (hereinafter emergent light$_6$), the second group 602 represents the emergent light within the range of 18 degrees around the axis z (hereinafter emergent light$_{18}$) and the third group 603 represents the emergent light within the range of 30 degrees around the axis z (hereinafter emergent light$_{30}$).

The results of this simulation show the tendency that the ratio of the emergent light 30 increases as the average slope ($\theta_{ave}$) increases, but begins to decrease after a certain point. Studies conducted accordingly to find a comprehensive indicator regarding the geometry of surface roughness which is correlated with the emergent light 30 revealed that the correlation with the emergent light 30 can be best described by using a quotient between or the product of the average slope ($\theta_{ave}$) and the ratio of the length of the curve (L1) to the length of the bottom of the curve 401 (Lr=L2/L1, hereinafter "curve length ratio").

Figure 7:
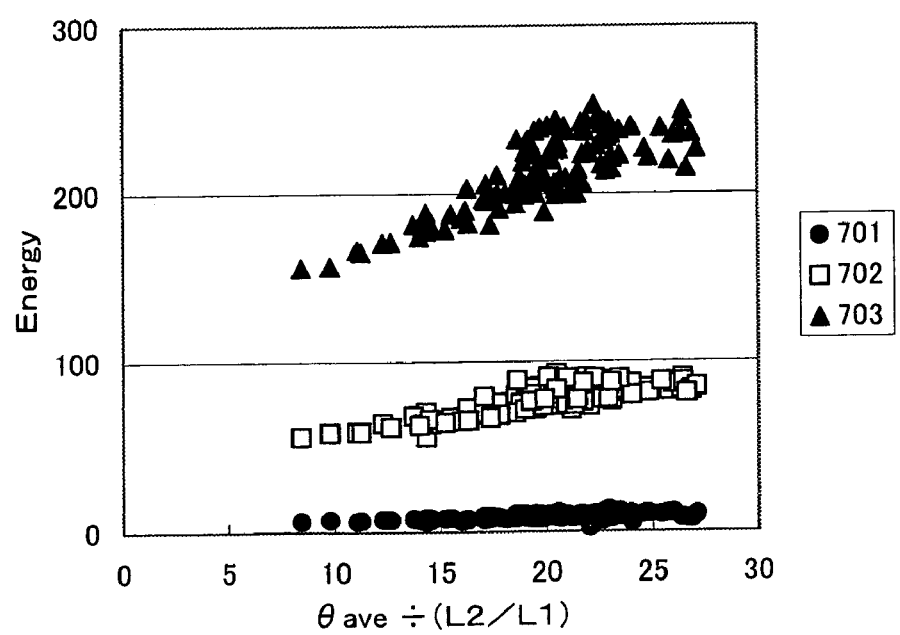
FIG. 7 shows the results of 3-dimensional simulation.
Figure 8:
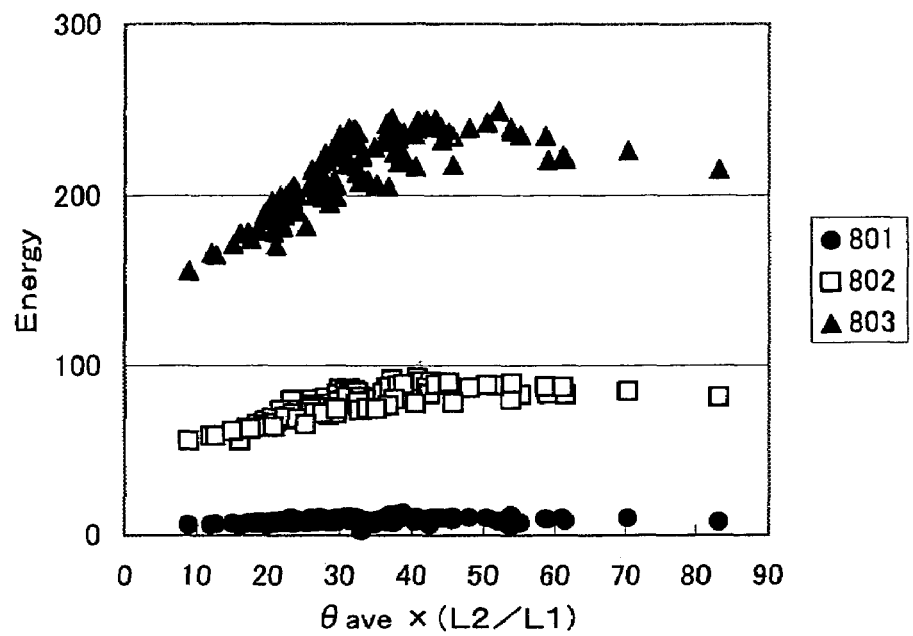
FIG. 8 shows the results of 3-dimensional simulation.

FIGS. 7 and 8 show the results of simulation. FIG. 7 shows changes in energy of emergent light, where the vertical axis represents the values obtained by dividing the average slope ($\theta_{ave}$) by the curve length ratio (Lr). FIG. 8 shows changes in energy of emergent light, where horizontal axis represents the values obtained by multiplying the average slope ($\theta_{ave}$) by the curve length ratio (Lr).

The results of these simulations reveal that when the value obtained by dividing the average of absolute values of slope ($\theta_{ave}$) of the curve by the curve length ratio (Lr) (quotient) is 20 or higher, and when the value obtained by multiplying the average of absolute values of slope of the curve ($\theta_{ave}$) by the curve length ratio (Lr) (product) is 25 or higher but 60 or lower, the energy of emergent light within the range of emergent angle of 30 degrees markedly increases. As the rough surface pattern formed on the film surface can be considered as the assembly of multiple protrusion patterns, aforementioned relationship can be applied to the rough surface pattern formed on the film surface. Accordingly, it should be understood that a light control film with a high front luminance and a proper light diffusive property can be formed by satisfying the undermentioned condition (Formula (1) or Formula (2)).

$$\theta_{ave} \div Lr \geq 20 \quad (1)$$

$$25 \leq \theta_{ave} \times Lr \leq 60 \quad (2)$$

where, $\theta_{ave}$ is the average of absolute values of slope to the reference plane of the profile curve contoured by the rough surface pattern regarding an arbitrary cross section perpendicular to the base plane of the film and Lr is the ratio of the length (L2/L1) of a straight line (L1) drawn by intersection of the base plane and the cross section to the length of a profile curve (L2).

Further, the value obtained by dividing the average ($\theta_{ave}$) by the curve length ratio (Lr) in Formula (1) is more preferably 25 or higher, while the value obtained by multiplying the average slope ($\theta_{ave}$) by the curve length ratio (Lr) in Formula (2) is more preferably 35 or higher and 50 or lower.

Condition 3 needs to be satisfied for substantially all cross sections. "To be satisfied for substantially all cross sections" means that the condition needs to be satisfied for most of the cross sections of a particular light control film observed, but a few cases which contain one or two cross sections which do not satisfy the condition may be included. For example, said conditions may not be satisfied due to a fewer rough surface patterns for the cross section at the edge of the light control film, while it is considered that the conditions of this invention are satisfied if aforementioned conditions are satisfied for a relatively long profile curve.

Aforementioned 3-dimensional simulation assumes the protrusion patterns made of the material with the refraction index of 1.5. However, the rough surface pattern of the light control film of this invention can employ material used generally in optical film, the refraction index of which is not limited to 1.5. By taking the refraction index n into account, the aforementioned formulas (1) and (2) can be generalized as follows:

$$\theta_{ave}+Lr\times n^2 \geq 40 \quad (3)$$

$$50 \leq \theta_{ave} \times Lr \times n^2 \leq 135 \quad (4)$$

Further, the value of Formula (3) is more preferably 50 or higher, while the lowest value and the highest value of Formula (4) are more preferably 70 or more and 115 or less, respectively. By designing the geometry of the rough surface pattern by taking the refraction index of the material composing the rough surface pattern into account, the luminance towards the front can be further improved.

The light control film of this invention is able to attain a high front luminance and a certain extent of light diffusiveness by designing rough surface patterns to satisfy the aforementioned conditions. The light control film of this invention having such characteristics can be used as a film for controlling the direction of emergent light by placing the film directly on, for example, a light guiding plate of an edge-light backlight device or above the light source of a direct backlight device via a light diffusion plate.

Additional Conditions

Further, it is preferable that, in the light control film of this invention, the average slope ($\theta_{ave}$) of rough surface patterns is changed by taking account of the relationship with the location of a light source of a backlight device. Regarding the relationship with the light source, when a long and narrow light source is located at one end or both opposite ends of a backlight, the angle to the longitudinal direction of the light source and the distance from the light source needs to be taken account.

Figure 9:
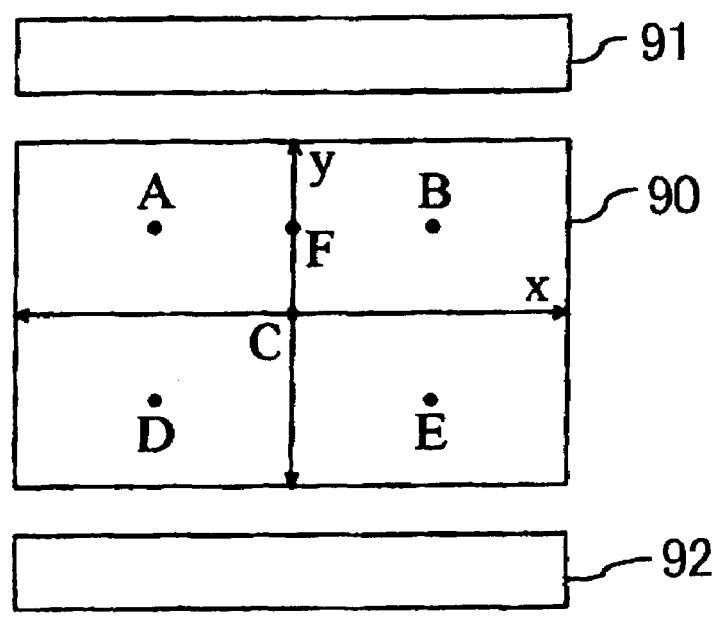
FIG. 9 shows a location at which the luminance of the backlight is measured.
Figure 10:
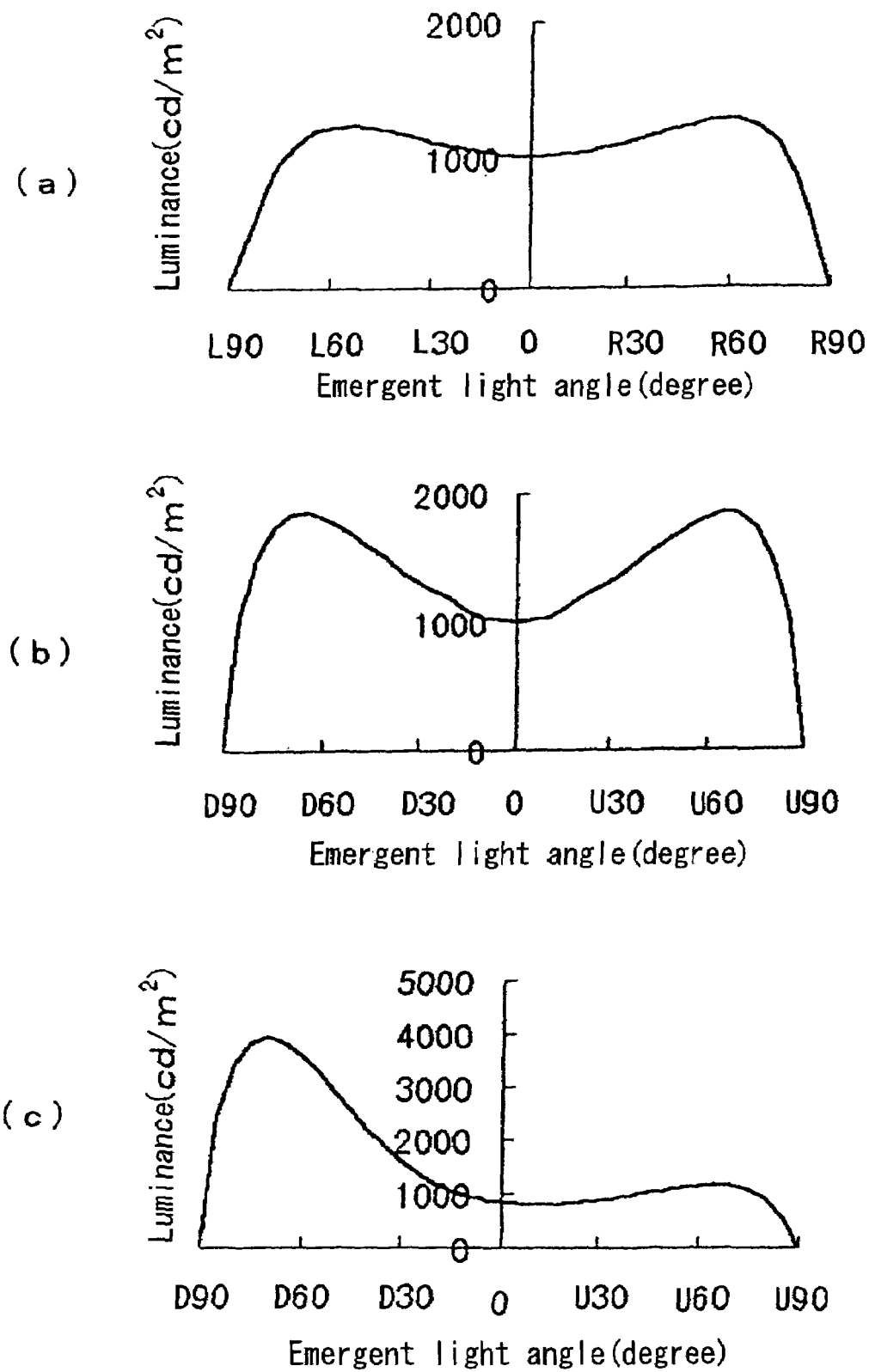
FIG. 10 shows distributions of emergent angles at different measurement locations or at different directions of emergent angle measurement to the light source, where (a) is a distribution of emergent angles measured at the center of the film in a direction parallel to the light source, (b) is a distribution of emergent angles measured at the center of the film in a direction perpendicular to the film, and (c) is a distribution of emergent angles measured not at the center of the film but closer to the light source in a direction perpendicular to the light source.

Regarding the angle to the longitudinal direction of a light source, when angular dependence of luminance of emergent light of backlight (angular dependence of luminance) is measured, at almost all measurement points the luminance at the emergent angle leaning greatly from the front tends to become higher in general as the measurement direction moves from parallel to perpendicular to the longitudinal direction of the light source. For example, when the luminance at the emergent angle is measured at the center point C in direction parallel to the light sources 91 and 92 (x direction in FIG. 9) in the backlight in which light sources 91 and 92 are located on two parallel ends of the light guiding plate 90 as shown in FIG. 9, a uniform luminance in the wide range of emergent angle as shown in FIG. 10(a) is obtained at most measurement points. On the other hand, when the luminance at the emergent angle is measured at the point C in direction perpendicular to the light sources 91 and 92, the luminance at large emergent angles tends to be higher as shown in FIG. 10(b). Such tendency is conspicuous in an edge-light backlight, while it is also seen in a direct backlight in which the part of the light diffusion material corresponding to the light source is dot-patterned.

In order to correct difference in such angular dependence of luminance of the backlight, it is preferable that the average slope of a profile curve in the light control film of this invention is made larger as the direction of the cross section becomes from parallel to perpendicular to the light source. By doing so, the light leaning greatly from the front can be oriented to the front, thereby increasing the front luminance.

It is preferable that the condition (hereinafter Condition 5) for correcting difference in the angular dependence of luminance of this backlight are satisfied by a profile curve on the cross section assumed in any direction from any point on the film, and regardless of the direction of the cross section, either of aforementioned Conditions 1-4 needs to be satisfied. In order for the rough surface pattern to satisfy either of aforementioned Conditions 1-4, and Condition 5, which requires gradual increase of the average slope of substantially all profile curves depending on the angle of the cross section to the longitudinal direction of a light source, every single protrusion pattern composing rough surface patterns should be shaped to satisfy Condition 5. In other words, by shaping the cross section parallel to the bottom in the protrusion pattern shown in FIG. 4 not as a complete round shape but an oval shape, whose axis becomes shorter as it moves from the direction parallel (x-axis direction, for example) to perpendicular (y-axis direction, for example) to the longitudinal direction of a light source, this pattern is able to have an anisotropic property due to the relationship between the slope of a profile curve and the light source.

With respect to the distance from a light source, if angular dependence of luminance of luminance in the direction perpendicular (direction y in FIG. 9) to the direction of a light source is measured, the luminance at the emergence angle leaning greatly from the front tends to be higher as the measurement point is closer to the light source. For example, FIG. 10(C) shows the luminance at the emergent angle perpendicular to the light source 91 when it was measured at point F, which is closer to the light source 91 on one end, rather than to the center point C of the light guiding plate shown in FIG. 9. In order to correct such angular dependence of luminance, which depends on the distance from a light source, the slope is increased or decreased gradually depending whether the slope plane of the rough surface pattern is on the side of the light source or on the opposite side of the light source. Specifically, if the slope plane is on the side of the light source, the slope is increased as it approaches closer to the light source, while if the slope plane is on the opposite side of the light source, the slope is decreased as it approaches closer to the light source. The abovementioned conditions of changing slope according to the distance from the light source need not to be satisfied by all adjacent protrusions in the rough surface pattern, but need to be satisfied only by the average slope of rough surface patterns contained in the segments formed by dividing a profile curve with an appropriate interval. This is shown in FIG. 11 and FIG. 12.

Figure 11:
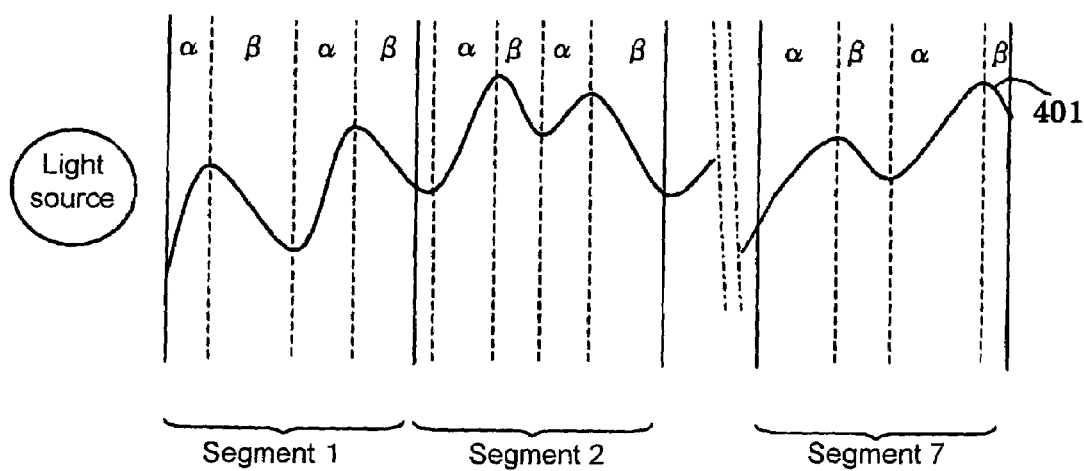
FIG. 11 illustrates a profile curve of a light control film capable of correcting emergent angle distribution dependency on the distance from the light source.

FIG. 11 shows the case in which a light source is on one end (left end in the figure), in which the profile curve 401 is divided into 7 segments, and the slope α on the side of the light source and the slope β on the opposite side are separated by a dotted line. Regarding the rough surface patterns contained in each segment of this profile curve, the average of absolute values of slopes α on the side of the light source is made to increase as it approaches closer to the light source, or as it moves from segment 7 to segment 1, whereas the average of absolute values of slopes β on the opposite side of the light source is made to decrease as it moves from segment 7 to segment 1. By thus changing the slope in accordance with the distance from the light source and depending on whether the slope is towards the light source or not, the ratio of the emergent light oriented to the front direction can be increased even near the light source, thereby increasing the uniformity of luminance.

Figure 12:
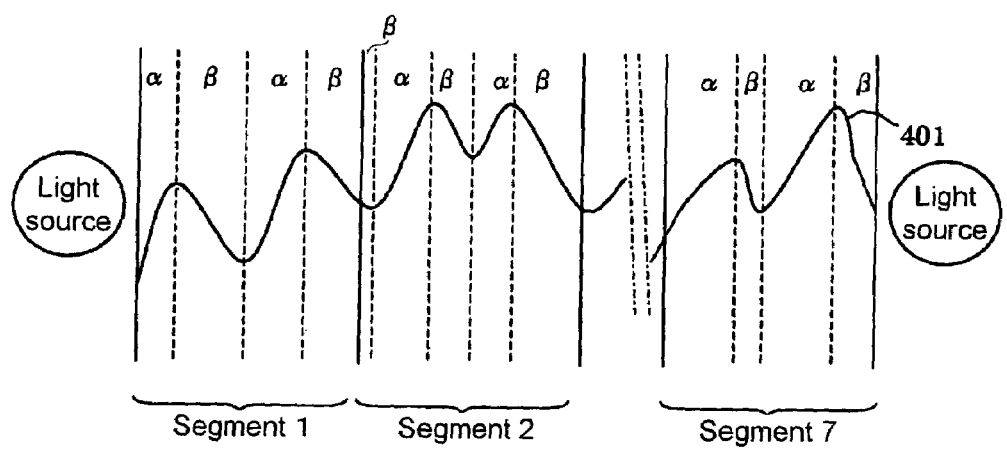
FIG. 12 illustrates a profile curve of a light control film capable of correcting emergent angle distribution dependency on the distance from the light source.
Figure 1:
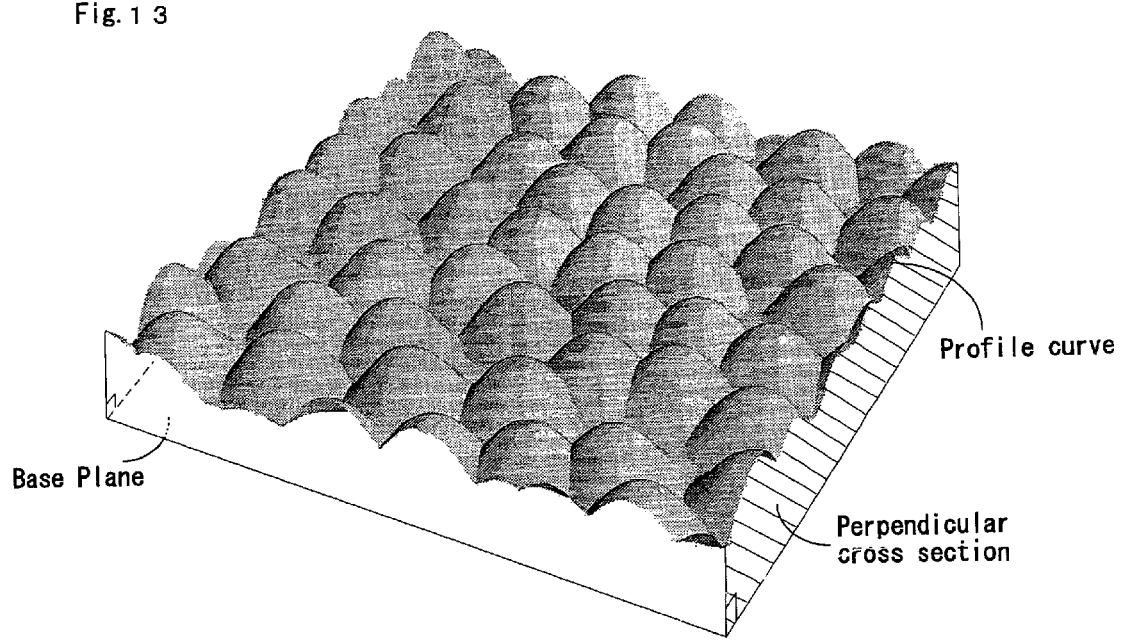

FIG. 12 shows the case in which a light source is on both ends, wherein the profile curve 401 is also divided into 7 segments, and the slopes α on the side of the left light source and the slopes β on the right side of the light source are separated by a dotted line. In this case, the average of absolute values of slopes α on the left light source side contained in each segment is made to increase as it approaches closer to the left light source, namely it moves from segment 7 to segment 1, whereas the average of absolute values of slopes β on the right light source side is made to increase as it approaches closer the right light source, namely it moves from segment 1 to segment 7. Also in this case, by correcting the tendency that the luminance at the emergent angle leaning greatly from the front is increased as approaching the light source, the front luminance can be improved and be made uniform.

Conditions to be satisfied by the rough surface pattern of the light control film of this invention for obtaining optimal luminance are explained above relative to the light source. Also in this case, regarding substantially all cross sections, each profile curve needs to satisfy either of the aforementioned Conditions 1-4.

The geometry or configuration of the protrusion of the light control film of this invention is not limited as far as the profile curve of the rough surface patterns satisfies the aforementioned conditions, but the protrusions and recesses are preferably arranged randomly. By this random arrangement, the aforementioned conditions can be satisfied more easily for substantially all cross sections and the generation of interference patterns is prevented. Each protrusion and recess can be shaped same or differently, and can be placed one upon another. Or, a part or all protrusions and recesses can be arranged to be piled up. The height of protrusion and the depth of recess is preferably about 3-100 μm and the protrusions or recesses are arranged preferably in a density of 10-200,000 protrusions or recesses/mm². Typical rough surface patterns of a light control film which satisfies aforementioned conditions are shown in FIG. 13.

Concrete configurations for producing a light control film having aforementioned rough surface patterns will be explained below.

As materials for producing a substrate 11 and a rough surface pattern layer 12 of the light control film of this invention, any material generally used for optical films can be used. Substrate 11 can be produced with any material having a good light transmittance, including but not limited to polyethylene terephthalate, polybutylene terephthalate, polyethylene naphthalate, polycarbonates, polyethylenes, polypropylenes, polystyrenes, triacetyl cellulose, acrylic, polyvinyl chloride and other plastic films.

Material for producing a rough surface patterned layer 12 can also be any material having a good light transmittance, including but not limited to glass and polymer resin. Examples of such glass include oxidized glass, such as silicate glass, phosphate glass and borate glass. Examples of such polymer resin include thermoplastic resin, thermosetting resin and ionizing radiation setting resin, such as polyester resin, acrylic resin, acrylic urethane resin, polyester acrylate resin, polyurethane acrylate resin, epoxy acrylate resin, urethane resin, epoxy resin, polycarbonate resin, cellulose resin, acetal resin, vinyl resin, polyethylene resin, polystyrene resin, polypropylene resin, polyamide resin, polyimide resin, melamine resin, phenol resin, silicone resin and fluorine resin.

Among these materials, polymer resin, particularly that having a refraction index (JIS-K7142:1996) of 1.3-1.7, is preferably used from the standpoint of good processibility and handlability. Even if a material whose refraction index n is not within the aforementioned range is used as a material for forming a rough surface pattern, good luminance can be attained if the rough surface pattern thus formed satisfies condition 1 or condition 3. However, high luminance can be obtained obviously by using the material with a refraction index within such range. In particular, the front luminance can be further improved by making the rough surface pattern satisfy condition 2 or condition 4 according to the refraction index n of the material.

The rough surface patterned layer 12 may contain light diffusion agents, such as organic beads and inorganic pigments as an ordinary light diffusion sheet, but the light diffusion agents are not indispensable. In the light control film of this invention, the rough surface pattern itself can give some extent of light diffusion effects, without adding such light diffusion agent. Accordingly, any damage of other material caused by the light diffusion agent or the generation of waste of exfoliated light diffusion agent will not occur.

The rough surface patterned layer 12 can be formed by using, for example, (1) emboss roll methods (2) etching processing or (3) molding. In a sense that a light control film with certain rough surface patterns can be produced with high reproducibility, the use of the molding method is preferable. Concretely, the light control film having such rough surface patterns can be produced by producing a mold having a pattern symmetrical to the rough surface pattern, pouring material for producing rough surface patterns, including polymer resin into said mold and taking out the material after setting. When a substrate is used, the rough surface pattern can be produced by pouring polymer resin etc., into a mold, placing a transparent substrate on it, setting the polymer resin, and taking it out together with the transparent substrate from the mold.

The methods for producing a pattern symmetrical to the rough surface pattern on a mold include but not limited to the following methods: A rough surface pattern in which one of the protrusions satisfies Formula (1) is formed on a flat surface with a density of several thousands/mm² by using a laser micro-processing technology. Then, by using this as a male mold, a female mold to be used for molding is produced. Several different blocks, which have a different slope of the rough surface pattern, are produced. Then a male mold for a light control film is produced by placing these blocks in certain arrangement, and a female mold is produced using this male mold. Alternatively, after producing a resin plate having unevenness by setting the resin in which particles of a certain size are dispersed, such rough surface patterned surface is measured by using a surface profiler and a resin plate which satisfies the aforementioned conditions is chosen. The plate thus chosen is used as a male mold to produce a female mold for molding.

The surface of a light control film, opposite to the rough surface patterned surface can be flat or smooth, but it can be subjected to micro-matting treatment to prevent the generation of the Newton rings when contacting with a light guiding plate or resin plate, and/or to the anti-reflection treatment to improve light transmittance.

Further, in order to obtain a good front luminance, the Haze, one of the optical characteristics, should be 60% or higher, or preferably 70% or higher, wherein Haze is a value of Haze based on JIS-K7136:2000, and can be obtained from the formula, Haze (%)=[($\tau_4/\tau_2$)−$\tau_3$($\tau_2/\tau_1$)]×100 ($\tau_1$: bundle of incident light, $\tau_2$: total bundle transmitting a specimen, $\tau_3$ bundle diffused in a device, $\tau_4$: bundle diffused in a device and specimen).

There is no limitation on thickness of a light control film as a whole, but the film is approximately 20-300 μm thick in general.

The light control film of the invention as explained above is used mainly as a component of a back light composing a liquid crystal display, illuminated sign and others.

A backlight of this invention will be explained below. The backlight of this invention comprises at least a light control film and a light source. The aforementioned light control film is used as a light control film. No limitation is applied to the direction of the light control film in a backlight, but the rough surface patterned side is used preferably as the light emergent side. The backlight preferably employs a configuration, as called edge-light or direct type.

An edge-light backlight comprises a light guiding plate, a light source located on at least one end of the light guiding plate, a light control film located on the light emergent side of the light guiding plate etc., where the light control film is preferably used as the rough surface patterned surface represents a light emergent surface.

A light guiding plate comprises an almost flat plate which is molded so that at least one side represents a light incident surface and the other surface orthogonally crossing said surface represents a light emerging surface, and is made of matrix resin selected from highly transparent resins mainly including polymethylmetacrylate. Resin particles with a different refraction index from that of the matrix resin may be added, in line with the purpose of use. Every surface of the light guiding plate needs not to be uniformly flat, but may be complicatedly shaped or may have diffusion prints such as a dot pattern.

As a light source, which should be located on at least one end of the light guiding plate, a cold cathode ray tube is mainly used. The shape of the light source maybe linear, L-shaped, etc.

An edge-light backlight is equipped with, in addition to the aforementioned light control film, a light guiding plate and a light source, a reflective plate, a polarizing film, an electromagnetic shield film, etc., in line with the purpose of use.

Figure 14:
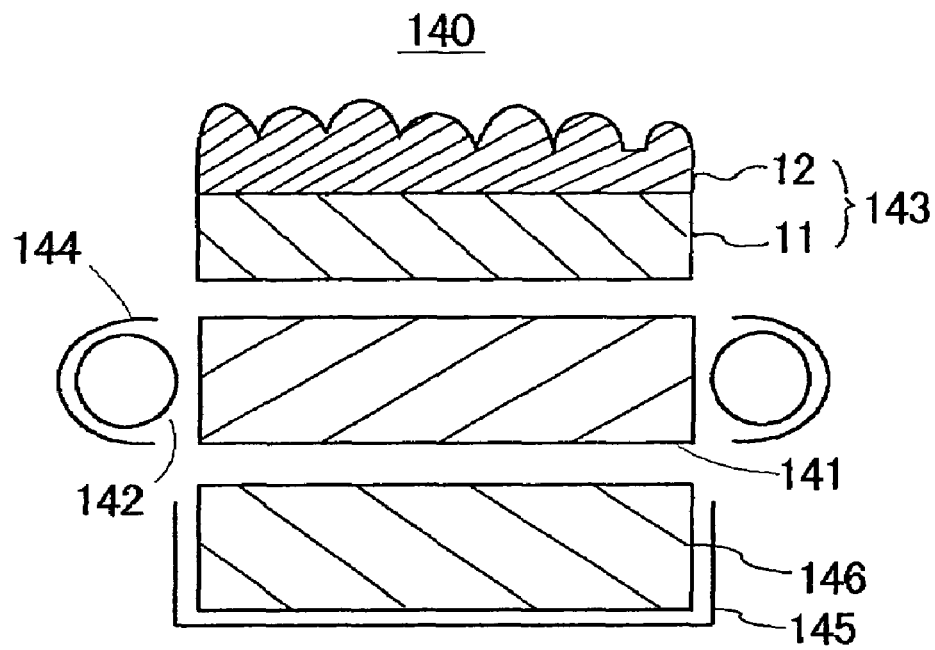
FIG. 14 shows a backlight device of this invention according to an embodiment of this invention.

An embodiment of the edge-light backlight of this invention is shown in FIG. 14. This backlight 140 has a configuration, in which a light source 142 is placed on both ends of the light guiding plate 141, on which a light control film 143 is placed as the rough surface patterned surface represents the outer side. The light source 142 is covered by a light source reflector 144, except the part opposing to the light guiding plate 141, to make the light from the light source enters effectively into the light guiding plate 141. Further, a reflective plate 146 stored in a chassis 145 is located under the light guiding plate 141, to return the light emerging to the other side of the emergent side of the light guiding plate 141, thereby increasing the emergent light from the emergent surface of the light guiding plate 141.

The direct backlight comprises a light control film and an light diffusion material and a light source located on the surface opposite to the light emergent surface of the light control film, in which the light control film is used preferably as a rough surface patterned surface represents a light emergent surface.

As the light diffusion material, which is used for the purpose of eliminating the pattern of the light source, in addition to a transparent film (lighting curtain) having a dot pattern in a position corresponding to the light source, so called light diffusion film having an uneven light diffusion layer on the transparent substrate can be used alone or in combination with others, as it is deemed appropriate.

A cold cathode ray tube is mainly used as the light source. The shape of the light source may be linear, L-shaped, etc. A direct backlight may be equipped with, in addition to aforementioned light control film, a light guiding plate and a light source, a reflective plate, a polarizing film, an electromagnetic shield film, etc., in line with the purpose of use.

Figure 15:
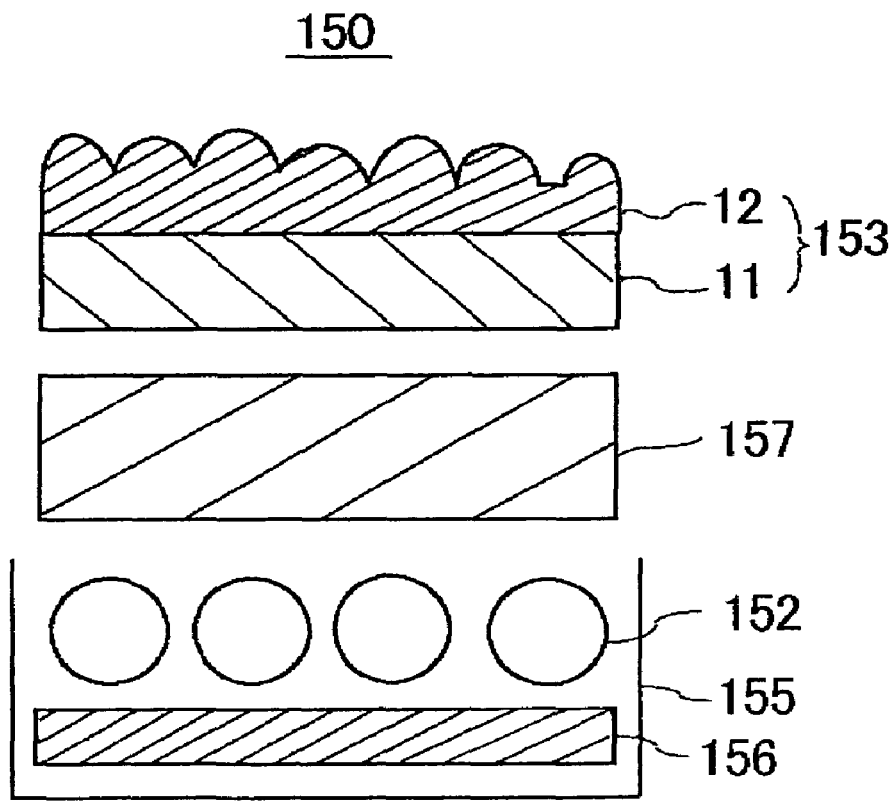
FIG. 15 shows a backlight device of this invention according to another embodiment of this invention.

An embodiment of the direct backlight of this invention is shown in FIG. 15. The backlight 150 has a structure, as illustrated in the figure, in which multiple units of light source 152 are placed on the light guiding plate 156 stored in the chassis 155, and the light control film 153 is laminated on the light source via the light diffusion material 157.

By using a light control film with a particular rough surface pattern, as a light control film for controlling the direction of a light emerging from a light source or a light guiding plate, the backlight of this invention can have a dramatically improved front luminance as compared with that of conventional backlights, without generating glare and/or interference patterns often observed when a prism sheet is used.

EXAMPLES

Examples of this invention will be explained in detail.

Examples 1-5

Five different molds (1)-(5) on which a certain rough surface pattern was formed by using a laser micro-processing technology were produced. Then, the light control films (1)-(5) of 23 cm (in direction perpendicular to a light source)×31 cm (in direction parallel to a light source) were produced by pouring silicon resin with a refraction index of 1.40 into a mold (1) and ultraviolet setting resin with a refraction index of 1.50 into molds (2)-(5), setting the poured resin and taking them out from the molds.

Then, the profile of the rough surface patterned surface (light emergent surface) of the light control films (1)-(5) was measured according to JIS B 0651 by using a surface profiler (SAS-2010 SAU-II: Meishin Koki Co. Ltd.). The shape of a stylus used in this surface profiler was conical with a globe on a tip, where a tip radius is 2 μm and a taper angle is 60 degree. Measurement interval was 1.0 μm. The measurement was conducted on 5 positions on each light control film, and the average of the absolute values of slope to the light incident surface was calculated by using profile curves in different directions. These 5 measurement points on the film are points A-E as shown in FIG. 9, i.e., 5 points for dividing each of 2 virtual diagonal lines on the optical film into 4 parts (excluding the starting and the end points of the diagonal line). Further, the measurement was conducted at every 15 degree by rotating the profile curve anti-clockwise from the starting (zero degree) point—parallel to the light sources 91 and 92, till returning to the starting or parallel to the light source. (However, the measurement at 180 degrees was excluded because it is the same with the measurement at 0 degree). Results of the measurements for the optical films (1)-(5) are shown in Tables 1-5 (unit is degree).

TABLE 1

|  | A | B | C | D | E |
|---|---|---|---|---|---|
| 0° | 35.5 | 34.8 | 39.9 | 35.2 | 35.2 |
| 15° | 39.9 | 39.6 | 40.1 | 39.8 | 39.9 |
| 30° | 44.2 | 44.6 | 44.5 | 44.4 | 44.1 |
| 45° | 47.5 | 47.5 | 47.5 | 47.4 | 47.6 |
| 60° | 49.8 | 49.6 | 49.4 | 49.4 | 49.8 |
| 75° | 50.4 | 50.6 | 50.4 | 50.3 | 50.3 |
| 90° | 51.4 | 51.4 | 51.1 | 50.9 | 51.1 |
| 105° | 50.3 | 50.5 | 50.8 | 50.6 | 50.3 |
| 120° | 49.2 | 49.8 | 49.7 | 50.0 | 49.4 |
| 135° | 47.2 | 47.3 | 47.6 | 47.7 | 47.4 |
| 150° | 44.4 | 43.9 | 44.6 | 44.4 | 44.6 |
| 165° | 39.7 | 39.8 | 39.8 | 39.9 | 39.8 |

TABLE 2

|  | A | B | C | D | E |
|---|---|---|---|---|---|
| 0° | 32.4 | 31.7 | 36.4 | 32.1 | 32.2 |
| 15° | 36.5 | 36.3 | 36.8 | 36.5 | 36.5 |
| 30° | 40.7 | 41.2 | 41.1 | 41.0 | 40.6 |
| 45° | 44.2 | 44.2 | 44.1 | 44.1 | 44.3 |
| 60° | 46.5 | 46.3 | 46.1 | 46.1 | 46.6 |
| 75° | 47.2 | 47.4 | 47.1 | 47.0 | 47.1 |
| 90° | 48.1 | 48.2 | 47.8 | 47.6 | 47.8 |
| 105° | 47.1 | 47.2 | 47.6 | 47.3 | 47.1 |
| 120° | 45.9 | 46.5 | 46.5 | 46.7 | 46.1 |
| 135° | 43.8 | 44.0 | 44.2 | 44.4 | 44.0 |
| 150° | 41.0 | 40.4 | 41.1 | 41.0 | 41.3 |
| 165° | 36.3 | 36.4 | 36.4 | 36.6 | 36.5 |

TABLE 3

|  | A | B | C | D | E |
|---|---|---|---|---|---|
| 0° | 33.5 | 33.2 | 33.1 | 32.6 | 33.0 |
| 15° | 38.4 | 38.1 | 37.9 | 37.8 | 38.2 |
| 30° | 44.1 | 44.0 | 43.9 | 44.0 | 44.1 |
| 45° | 47.9 | 47.8 | 47.9 | 47.9 | 48.0 |
| 60° | 50.4 | 50.7 | 50.5 | 50.4 | 50.5 |
| 75° | 51.7 | 52.0 | 51.9 | 51.8 | 51.7 |
| 90° | 52.5 | 52.8 | 52.7 | 52.4 | 52.5 |
| 105° | 51.7 | 52.0 | 51.9 | 51.8 | 51.6 |
| 120° | 50.4 | 50.6 | 50.7 | 50.4 | 50.4 |
| 135° | 47.9 | 48.2 | 48.0 | 47.9 | 47.9 |
| 150° | 44.2 | 44.4 | 44.2 | 43.9 | 43.9 |
| 165° | 38.4 | 38.3 | 38.1 | 37.8 | 37.9 |

TABLE 4

|  | A | B | C | D | E |
|---|---|---|---|---|---|
| 0° | 38.6 | 38.6 | 38.6 | 38.6 | 38.5 |
| 15° | 38.1 | 38.1 | 38.2 | 38.2 | 38.2 |
| 30° | 38.3 | 38.4 | 38.5 | 38.7 | 38.9 |
| 45° | 38.9 | 38.6 | 38.4 | 38.1 | 37.8 |
| 60° | 37.6 | 37.5 | 37.7 | 37.7 | 38.1 |
| 75° | 38.6 | 39.0 | 39.4 | 39.4 | 39.0 |
| 90° | 38.5 | 37.9 | 37.3 | 37.1 | 37.3 |
| 105° | 37.8 | 38.2 | 38.8 | 39.0 | 39.0 |
| 120° | 38.9 | 38.6 | 38.2 | 37.7 | 37.4 |
| 135° | 37.5 | 37.5 | 37.9 | 38.3 | 38.6 |
| 150° | 37.7 | 38.3 | 37.8 | 37.8 | 38.8 |
| 165° | 38.2 | 38.6 | 38.1 | 39.0 | 38.6 |

TABLE 5

|  | A点 | B点 | C点 | D点 | E点 |
|---|---|---|---|---|---|
| 0° | 25.5 | 25.5 | 25.5 | 25.5 | 25.5 |
| 15° | 25.2 | 25.3 | 25.3 | 25.3 | 25.4 |
| 30° | 25.4 | 25.4 | 25.4 | 25.5 | 25.5 |
| 45° | 25.6 | 25.4 | 25.4 | 25.3 | 25.2 |
| 60° | 25.2 | 25.1 | 25.3 | 25.2 | 25.3 |
| 75° | 25.5 | 25.6 | 25.8 | 25.8 | 25.7 |
| 90° | 25.6 | 25.3 | 24.9 | 24.9 | 25.0 |
| 105° | 25.4 | 25.5 | 25.7 | 25.7 | 25.7 |
| 120° | 25.6 | 25.6 | 25.4 | 25.2 | 25.1 |
| 135° | 25.1 | 25.2 | 25.3 | 25.5 | 25.7 |
| 150° | 25.6 | 25.2 | 25.3 | 25.3 | 25.4 |
| 165° | 25.6 | 25.5 | 25.6 | 25.7 | 25.4 |

As the data in Tables 1-5 indicates, the light control films of Examples have the average of absolute values of slope of a profile curve of 20 degrees or higher and 75 degrees or lower in all directions at all measuring points. Further, as the data in Tables 1-3 clearly shows, the average of absolute values of slope in the light control films (1)-(3) increases as the direction of a profile curve moves from parallel (0 and 180 degree) to perpendicular (90 degree) to the light source.

Then, the profile curve in direction perpendicular (direction y in FIG. 9) to the light source (cold cathode ray tube) of the backlight at points A, C and E of the light control films (1)-(5) were divided into 7 segments, and the average of absolute values of slope of the inclining surface on the light source side and on the opposite side of the light source of each profile curve was calculated by each divided interval. Results obtained for the light control films (1)-(5) are shown in Tables 6-10 (Unit: degree). The results of measurement were divided into two depending on whether the standard light source is the light source 91 or the light source 92, and divided segments were defined as segment 1 to segment 7 as it approaches from the light source 91 to the light source 92.

TABLE 6

|  |  | point A | | point C | | point E | |
|---|---|---|---|---|---|---|---|
|  |  | Light Source Side | Opposite Side | Light Source Side | Opposite Side | Light Source Side | Opposite Side |
| From Light Source 91 | Segment1 | 57.1 | 42.7 | 57.0 | 42.8 | 57.4 | 42.7 |
|  | Segment2 | 56.0 | 48.5 | 56.0 | 48.7 | 56.2 | 48.6 |
|  | Segment3 | 54.1 | 52.4 | 54.4 | 52.8 | 54.4 | 52.7 |
|  | Segment4 | 53.3 | 53.3 | 53.7 | 53.6 | 53.4 | 53.5 |
|  | Segment5 | 52.6 | 54.4 | 52.5 | 54.1 | 52.2 | 54.0 |
|  | Segment6 | 48.6 | 56.0 | 48.4 | 55.8 | 48.2 | 55.3 |
|  | Segment7 | 42.8 | 57.5 | 42.5 | 56.9 | 42.4 | 56.5 |

TABLE 6-continued

|  |  | point A | | point C | | point E | |
|---|---|---|---|---|---|---|---|
|  |  | Light Source Side | Opposite Side | Light Source Side | Opposite Side | Light Source Side | Opposite Side |
| From Light Source 92 | Segment1 | 42.7 | 57.1 | 42.8 | 57.0 | 42.7 | 57.4 |
|  | Segment2 | 48.5 | 56.0 | 48.7 | 56.0 | 48.6 | 56.2 |
|  | Segment3 | 52.4 | 54.1 | 52.8 | 54.4 | 52.7 | 54.4 |
|  | Segment4 | 53.3 | 53.3 | 53.6 | 53.7 | 53.5 | 53.4 |
|  | Segment5 | 54.4 | 52.6 | 54.1 | 52.5 | 54.0 | 52.2 |
|  | Segment6 | 56.0 | 48.6 | 55.8 | 48.4 | 55.3 | 48.2 |
|  | Segment7 | 57.5 | 42.8 | 56.9 | 42.5 | 56.5 | 42.4 |

TABLE 7

|  |  | point A | | point C | | point E | |
|---|---|---|---|---|---|---|---|
|  |  | Light Source Side | Opposite Side | Light Source Side | Opposite Side | Light Source Side | Opposite Side |
| From Light Source 91 | Segment1 | 54.1 | 39.3 | 54.1 | 39.3 | 54.4 | 39.3 |
|  | Segment2 | 52.9 | 44.9 | 52.9 | 45.1 | 53.1 | 45.0 |
|  | Segment3 | 51.4 | 48.6 | 51.4 | 49.1 | 51.7 | 48.9 |
|  | Segment4 | 50.5 | 50.4 | 50.9 | 50.7 | 50.7 | 50.7 |
|  | Segment5 | 48.8 | 51.6 | 48.7 | 51.4 | 48.4 | 51.2 |
|  | Segment6 | 44.9 | 53.1 | 44.8 | 52.8 | 44.5 | 52.3 |
|  | Segment7 | 39.5 | 54.4 | 39.1 | 54.0 | 38.9 | 53.6 |
| From Light Source 92 | Segment1 | 39.3 | 54.1 | 39.3 | 54.1 | 39.3 | 54.4 |
|  | Segment2 | 44.9 | 52.9 | 45.1 | 52.9 | 45.0 | 53.1 |
|  | Segment3 | 48.6 | 51.4 | 49.1 | 51.4 | 48.9 | 51.7 |
|  | Segment4 | 50.4 | 50.5 | 50.7 | 50.9 | 50.7 | 50.7 |
|  | Segment5 | 51.6 | 48.8 | 51.4 | 48.7 | 51.2 | 48.4 |
|  | Segment6 | 53.1 | 44.9 | 52.8 | 44.8 | 52.3 | 44.5 |
|  | Segment7 | 54.4 | 39.5 | 54.0 | 39.1 | 53.6 | 38.9 |

TABLE 8

|  |  | point A | | point C | | point E | |
|---|---|---|---|---|---|---|---|
|  |  | Light Source Side | Opposite Side | Light Source Side | Opposite Side | Light Source Side | Opposite Side |
| From Light Source 91 | Segment1 | 52.5 | 52.6 | 52.4 | 52.4 | 52.6 | 52.7 |
|  | Segment2 | 52.8 | 52.8 | 52.4 | 52.3 | 52.4 | 52.4 |
|  | Segment3 | 52.9 | 52.6 | 52.6 | 52.4 | 52.4 | 52.4 |
|  | Segment4 | 52.5 | 52.4 | 52.6 | 52.3 | 52.0 | 52.2 |
|  | Segment5 | 52.5 | 52.5 | 52.6 | 52.3 | 52.1 | 52.2 |
|  | Segment6 | 52.3 | 52.1 | 52.7 | 52.7 | 52.2 | 52.0 |
|  | Segment7 | 52.1 | 52.2 | 52.7 | 53.1 | 52.1 | 52.3 |
| From Light Source 92 | Segment1 | 52.6 | 52.5 | 52.4 | 52.4 | 52.7 | 52.6 |
|  | Segment2 | 52.8 | 52.8 | 52.3 | 52.4 | 52.4 | 52.4 |
|  | Segment3 | 52.6 | 52.9 | 52.4 | 52.6 | 52.4 | 52.4 |
|  | Segment4 | 52.4 | 52.5 | 52.3 | 52.6 | 52.2 | 52.0 |
|  | Segment5 | 52.5 | 52.5 | 52.3 | 52.6 | 52.2 | 52.1 |
|  | Segment6 | 52.1 | 52.3 | 52.7 | 52.7 | 52.0 | 52.2 |
|  | Segment7 | 52.2 | 52.1 | 53.1 | 52.7 | 52.3 | 52.1 |

TABLE 9

|  |  | point A | | point C | | point E | |
|---|---|---|---|---|---|---|---|
|  |  | Light Source Side | Opposite Side | Light Source Side | Opposite Side | Light Source Side | Opposite Side |
| From Light Source 91 | Segment1 | 40.4 | 40.4 | 40.6 | 40.5 | 40.9 | 40.6 |
|  | Segment2 | 40.5 | 40.5 | 40.5 | 40.7 | 40.3 | 40.5 |
|  | Segment3 | 41.0 | 40.8 | 40.6 | 40.7 | 40.1 | 40.4 |
|  | Segment4 | 41.0 | 41.0 | 40.7 | 40.5 | 40.0 | 40.1 |

TABLE 9-continued

|  |  | point A | | point C | | point E | |
|---|---|---|---|---|---|---|---|
|  |  | Light Source Side | Opposite Side | Light Source Side | Opposite Side | Light Source Side | Opposite Side |
|  | Segment5 | 40.7 | 40.7 | 40.6 | 40.5 | 40.0 | 40.0 |
|  | Segment6 | 40.1 | 40.2 | 40.7 | 40.6 | 40.0 | 39.9 |
|  | Segment7 | 40.2 | 40.3 | 40.9 | 41.1 | 40.0 | 40.3 |
| From Light Source 92 | Segment1 | 40.4 | 40.4 | 40.5 | 40.6 | 40.6 | 40.9 |
|  | Segment2 | 40.5 | 40.5 | 40.7 | 40.5 | 40.5 | 40.3 |
|  | Segment3 | 40.8 | 41.0 | 40.7 | 40.6 | 40.4 | 40.1 |
|  | Segment4 | 41.0 | 41.0 | 40.5 | 40.7 | 40.1 | 40.0 |
|  | Segment5 | 40.7 | 40.7 | 40.5 | 40.6 | 40.0 | 40.0 |
|  | Segment6 | 40.2 | 40.1 | 40.6 | 40.7 | 39.9 | 40.0 |
|  | Segment7 | 40.3 | 40.2 | 41.1 | 40.9 | 40.3 | 40.0 |

TABLE 10

|  |  | point A | | point C | | point E | |
|---|---|---|---|---|---|---|---|
|  |  | Light Source Side | Opposite Side | Light Source Side | Opposite Side | Light Source Side | Opposite Side |
| From Light Source 91 | Segment1 | 25.5 | 25.5 | 25.3 | 25.3 | 25.5 | 25.6 |
|  | Segment2 | 25.5 | 25.5 | 25.3 | 25.3 | 25.7 | 25.4 |
|  | Segment3 | 25.5 | 25.5 | 25.4 | 25.4 | 25.4 | 25.3 |
|  | Segment4 | 25.5 | 25.6 | 25.4 | 25.4 | 25.4 | 25.4 |
|  | Segment5 | 25.5 | 25.5 | 25.4 | 25.3 | 25.3 | 25.4 |
|  | Segment6 | 25.2 | 25.3 | 25.4 | 25.4 | 25.2 | 25.3 |
|  | Segment7 | 25.2 | 25.3 | 25.5 | 25.4 | 25.2 | 25.2 |
| From Light Source 92 | Segment1 | 25.5 | 25.5 | 25.3 | 25.3 | 25.6 | 25.5 |
|  | Segment2 | 25.5 | 25.5 | 25.3 | 25.3 | 25.4 | 25.7 |
|  | Segment3 | 25.5 | 25.5 | 25.4 | 25.4 | 25.3 | 25.4 |
|  | Segment4 | 25.6 | 25.5 | 25.4 | 25.4 | 25.4 | 25.4 |
|  | Segment5 | 25.5 | 25.5 | 25.3 | 25.4 | 25.4 | 25.3 |
|  | Segment6 | 25.3 | 25.2 | 25.4 | 25.4 | 25.3 | 25.2 |
|  | Segment7 | 25.3 | 25.2 | 25.4 | 25.5 | 25.2 | 25.2 |

As clearly shown in Table 6 and Table 7, in the light control films (1) and (2), when the light source 91 (FIG. 9) is standard, the average of absolute values of slope of the inclining plane on the side of light source 91 increases as it approaches from segment 7 to segment 1. When the light source 92 is a standard (base point), the average of absolute values of slope of the inclining plane on the side of light source 92 increases as it approaches from segment 1 towards segment 7.

Haze values measured for each light control film in Examples 1-5 using a haze meter (HGM-2K: Suga Shikenki) were 91.3, 90.8, 90.1, 85.3 and 82.1 for light control film (1), (2), (3), (4) and (5), respectively. All of them satisfied optical characteristics required for obtaining good front luminance.

Then, each of the light control films (1)-(5) was incorporated into a 15-inch edge-light backlight (a cold cathode ray tube on both upper and lower position) to measure the front luminance. Specifically, the light control films (1)-(5) were placed on a light guiding plate as the rough surface patterned surface of the film becomes a light emergent surface, and the luminance at each emergent angle in direction parallel (direction x in FIG. 9) and perpendicular (direction-y in FIG. 9) to the light source (cold cathode ray tube) was measured at points A-E on the backlight (1 inch=2.54 cm). Results obtained for the light control films (1)-(5) are shown in Tables 11-15, in this order (Unit: cd/m$^2$)

TABLE 11

|  |  | A | B | C | D | E |
|---|---|---|---|---|---|---|
| Horizontal Direction x | L45° | 1070 | 1080 | 1170 | 1070 | 1060 |
|  | L30° | 1310 | 1310 | 1410 | 1310 | 1320 |
|  | 0° | 2750 | 2750 | 2960 | 2760 | 2770 |
|  | R30° | 1320 | 1330 | 1430 | 1310 | 1300 |
|  | R45° | 1080 | 1060 | 1170 | 1050 | 1070 |
| Vertical Direction y | U45° | 1150 | 1140 | 1260 | 1380 | 1390 |
|  | U30° | 1280 | 1270 | 1420 | 1620 | 1620 |
|  | 0° | 2750 | 2750 | 2960 | 2760 | 2770 |
|  | D30° | 1610 | 1610 | 1410 | 1270 | 1270 |
|  | D45° | 1370 | 1380 | 1250 | 1150 | 1140 |

TABLE 12

|  |  | A | B | C | D | E |
|---|---|---|---|---|---|---|
| Horizontal Direction x | L45° | 1040 | 1060 | 1170 | 1050 | 1050 |
|  | L30° | 1290 | 1310 | 1400 | 1310 | 1300 |
|  | 0° | 2720 | 2720 | 2930 | 2720 | 2700 |
|  | R30° | 1280 | 1290 | 1400 | 1290 | 1290 |
|  | R45° | 1050 | 1050 | 1180 | 1050 | 1050 |
| Vertical Direction y | U45° | 1130 | 1140 | 1230 | 1390 | 1370 |
|  | U30° | 1260 | 1250 | 1420 | 1630 | 1630 |
|  | 0° | 2720 | 2720 | 2930 | 2720 | 2700 |
|  | D30° | 1630 | 1630 | 1420 | 1240 | 1250 |
|  | D45° | 1390 | 1370 | 1240 | 1150 | 1130 |

TABLE 13

|  |  | A | B | C | D | E |
|---|---|---|---|---|---|---|
| Horizontal | L45° | 1050 | 1040 | 1160 | 1040 | 1050 |
| Direction x | L30° | 1270 | 1280 | 1360 | 1260 | 1270 |
|  | 0° | 2630 | 2630 | 2900 | 2620 | 2620 |
|  | R30° | 1280 | 1270 | 1380 | 1280 | 1260 |
|  | R45° | 1040 | 1050 | 1150 | 1040 | 1030 |
| Vertical | U45° | 1110 | 1120 | 1220 | 1390 | 1370 |
| Direction y | U30° | 1210 | 1220 | 1410 | 1650 | 1660 |
|  | 0° | 2630 | 2630 | 2900 | 2620 | 2620 |
|  | D30° | 1660 | 1650 | 1420 | 1220 | 1220 |
|  | D45° | 1360 | 1370 | 1220 | 1110 | 1110 |

TABLE 14

|  |  | A | B | C | D | E |
|---|---|---|---|---|---|---|
| Horizontal | L45° | 1000 | 978 | 1490 | 992 | 987 |
| Direction x | L30° | 1900 | 1880 | 2000 | 1900 | 1870 |
|  | 0° | 2090 | 2100 | 2380 | 2100 | 2090 |
|  | R30° | 1890 | 1890 | 2010 | 1880 | 1900 |
|  | R45° | 992 | 1010 | 1480 | 993 | 1010 |
| Vertical | U45° | 1000 | 996 | 1170 | 1460 | 1460 |
| Direction y | U30° | 1790 | 1810 | 2120 | 2570 | 2560 |
|  | 0° | 2090 | 2100 | 2380 | 2100 | 2090 |
|  | D30° | 2570 | 2580 | 2120 | 1820 | 1810 |
|  | D45° | 1460 | 1450 | 1170 | 978 | 996 |

TABLE 15

|  |  | A | B | C | D | E |
|---|---|---|---|---|---|---|
| Horizontal | L45° | 996 | 975 | 1090 | 993 | 978 |
| Direction x | L30° | 1670 | 1640 | 1850 | 1670 | 1650 |
|  | 0° | 1810 | 1820 | 2030 | 1800 | 1820 |
|  | R30° | 1650 | 1660 | 1840 | 1630 | 1670 |
|  | R45° | 987 | 1000 | 1090 | 974 | 1000 |
| Vertical | U45° | 987 | 996 | 1200 | 1790 | 1810 |
| Direction y | U30° | 1550 | 1560 | 2100 | 2770 | 2780 |
|  | 0° | 1810 | 1820 | 2030 | 1800 | 1820 |
|  | D30° | 2780 | 2770 | 2090 | 1560 | 1560 |
|  | D45° | 1790 | 1800 | 1210 | 1000 | 995 |

These results indicate that a good front luminance can be obtained by incorporating only one sheet of the light control film of Examples. Particularly, in the light control films (1)-(3), since the average of absolute values of slope of a profile curve increases as the direction of the profile curve moves from parallel (0 and 180 degree) to perpendicular (90 degree) to the light source, the backlight incorporating such light control film could efficiently orient the light leaning greatly from the front in direction perpendicular to the light source towards the direction to the front, thus attaining a good front luminance. In comparison of figures in Tables 11-13 with that in Tables 14 and 15, it is shown that, in the former, the front luminance is higher, and that the luminance at upper and lower 30 degrees and 40 degrees in vertical direction are considerably small relative to the luminance in front direction, thus suggesting that the light is effectively oriented towards the front.

In the light control films (1) and (2) in which the average of absolute values of slope of the inclining surface on the side of the light source 91 increases as it approaches closer to the light source, the light greatly leaning from the front (0 degree) in direction perpendicular to the light source can be effectively oriented to the front direction even at the points A, B, D and E, which are closer to the light source rather than to the center of the film (point C), thus attaining a good front luminance. In comparison of values in Tables 11 and 12 with those in Tables 13-15, difference in the front luminance between point C and points A, B, D and E is smaller in the Tables 11 and 12 and, with regard to vertical directions at points A, B, D and E, difference in luminance between upper 30 degree and lower 30 degree and between upper 45 degree and lower 45 degree are smaller, and are sufficiently smaller than the luminance in the front direction. It can be understood from this that the light is efficiently oriented to the front by reducing influence of positional change (polarization) of emergent light.

Examples 6-8

Three different molds (6)-(8) on which a certain rough surface pattern is formed by laser micro-processing technology were produced. Light control films (6)-(8) of 23 cm×31 cm were produced by pouring ultraviolet setting resin with a refraction index of 1.50 into molds (6) and (7) and silicon resin with refraction index of 1.40 into molds (8), setting the poured resin and taking them out from the molds.

Then, the profiles of the surface (light emergent surface) with the rough surface pattern of the light control films (6)-(8) were measured by using a laser microscope (VK-8500: KEYENCE) with an objective lens with magnification [×50]. Measurement interval was 0.29 μm. A profile curve was obtained by applying a low pass filter with a cutoff value of 2.5 μm to the measured profile curve, and the average of absolute values of slope ($\theta_{ave}$) to the light incident surface of this profile curve was calculated. In the same manner as in Examples of 1-5 the measurement was conducted at 5 positions on each light control film to calculate the average of absolute values of slope to the light incident surface for each profile curve of different direction. Further, by measuring the length (L2) of each profile curve and calculating its ratio to the length (L1) of the bottom of the section (Lr=L2/L1), the product or quotient between the average of absolute values of slope ($\theta_{ave}$) and the length ratio (Lr) were obtained.

Measurements obtained at 5 points A-E of each light control film (6)-(8) are shown in Tables 16-18 in order. Further, the averages of all measurements ($\theta_{ave}$, Lr, $\theta_{ave}$/Lr, $\theta_{ave}$×Lr) at five points A-E are shown in Table 19.

Haze values obtained for each light control film in examples 6-8 using a haze meter (HGM-2K: Suga Shikenki) are also shown in Table 19.

TABLE 16

|  | A | | | | B | | | |
|---|---|---|---|---|---|---|---|---|
|  | Average of Slope | L2/L1 | ÷ | × | Average of Slope | L2/L1 | ÷ | × |
| 0° | 35.6 | 1.33 | 26.7 | 47.5 | 35.1 | 1.33 | 26.5 | 46.5 |
| 15° | 35.5 | 1.33 | 26.6 | 47.3 | 35.0 | 1.32 | 26.5 | 46.4 |
| 30° | 35.4 | 1.33 | 26.6 | 47.1 | 35.2 | 1.33 | 26.5 | 46.6 |
| 45° | 35.4 | 1.33 | 26.6 | 47.0 | 35.5 | 1.33 | 26.7 | 47.3 |
| 60° | 35.4 | 1.33 | 26.6 | 47.0 | 35.6 | 1.33 | 26.7 | 47.5 |
| 75° | 35.3 | 1.33 | 26.5 | 46.9 | 35.8 | 1.34 | 26.8 | 47.9 |
| 90° | 35.4 | 1.33 | 26.6 | 47.1 | 36.1 | 1.34 | 26.9 | 48.5 |
| 105° | 35.4 | 1.33 | 26.6 | 47.1 | 36.1 | 1.34 | 26.9 | 48.6 |
| 120° | 35.3 | 1.33 | 26.6 | 46.8 | 36.1 | 1.34 | 26.9 | 48.6 |
| 135° | 35.1 | 1.33 | 26.5 | 46.6 | 35.9 | 1.34 | 26.8 | 48.0 |
| 150° | 35.1 | 1.33 | 26.5 | 46.5 | 35.7 | 1.33 | 26.7 | 47.6 |
| 165° | 35.1 | 1.33 | 26.5 | 46.5 | 35.4 | 1.33 | 26.7 | 47.1 |

TABLE 16-continued

| | C | | | | D | | | |
|---|---|---|---|---|---|---|---|---|
| | Average of Slope | L2/L1 | ÷ | × | Average of Slope | L2/L1 | ÷ | × |
| 0° | 35.2 | 1.33 | 26.5 | 46.6 | 35.2 | 1.32 | 26.6 | 46.6 |
| 15° | 34.8 | 1.32 | 26.4 | 46.0 | 35.2 | 1.32 | 26.6 | 46.6 |
| 30° | 34.9 | 1.32 | 26.4 | 46.1 | 35.3 | 1.33 | 26.6 | 46.8 |
| 45° | 34.9 | 1.32 | 26.4 | 46.3 | 35.4 | 1.33 | 26.6 | 47.1 |
| 60° | 35.0 | 1.33 | 26.4 | 46.5 | 35.5 | 1.33 | 26.6 | 47.4 |
| 75° | 35.3 | 1.33 | 26.5 | 47.0 | 35.7 | 1.34 | 26.7 | 47.8 |
| 90° | 35.6 | 1.33 | 26.7 | 47.4 | 35.8 | 1.34 | 26.7 | 47.9 |
| 105° | 35.7 | 1.33 | 26.7 | 47.6 | 35.6 | 1.34 | 26.7 | 47.5 |
| 120° | 35.7 | 1.33 | 26.7 | 47.6 | 35.3 | 1.33 | 26.6 | 46.9 |
| 135° | 35.6 | 1.33 | 26.7 | 47.5 | 35.0 | 1.32 | 26.5 | 46.3 |
| 150° | 35.4 | 1.33 | 26.6 | 47.1 | 34.7 | 1.32 | 26.3 | 45.7 |
| 165° | 35.3 | 1.33 | 26.6 | 46.8 | 34.7 | 1.32 | 26.3 | 45.7 |

| | E | | | |
|---|---|---|---|---|
| | Average of Slope | L2/L1 | ÷ | × |
| 0° | 34.5 | 1.32 | 26.2 | 45.5 |
| 15° | 34.7 | 1.32 | 26.3 | 45.9 |
| 30° | 35.0 | 1.33 | 26.4 | 46.5 |
| 45° | 35.3 | 1.33 | 26.6 | 47.0 |
| 60° | 35.7 | 1.33 | 26.8 | 47.7 |
| 75° | 36.0 | 1.34 | 26.9 | 48.2 |
| 90° | 36.1 | 1.34 | 26.9 | 48.3 |
| 105° | 36.1 | 1.34 | 26.9 | 48.3 |
| 120° | 36.0 | 1.34 | 26.9 | 48.2 |
| 135° | 36.0 | 1.34 | 26.9 | 48.3 |
| 150° | 35.9 | 1.34 | 26.8 | 48.1 |
| 165° | 35.8 | 1.34 | 26.8 | 47.8 |

TABLE 17

| | A | | | | B | | | |
|---|---|---|---|---|---|---|---|---|
| | Average of Slope | L2/L1 | ÷ | × | Average of Slope | L2/L1 | ÷ | × |
| 0° | 27.7 | 1.18 | 23.5 | 32.7 | 27.4 | 1.18 | 23.3 | 32.2 |
| 15° | 27.6 | 1.18 | 23.5 | 32.6 | 27.3 | 1.17 | 23.3 | 32.1 |
| 30° | 27.6 | 1.18 | 23.4 | 32.5 | 27.4 | 1.18 | 23.3 | 32.2 |
| 45° | 27.6 | 1.18 | 23.4 | 32.5 | 27.7 | 1.18 | 23.5 | 32.6 |
| 60° | 27.6 | 1.18 | 23.4 | 32.5 | 27.7 | 1.18 | 23.5 | 32.7 |
| 75° | 27.5 | 1.18 | 23.4 | 32.4 | 27.9 | 1.18 | 23.6 | 32.9 |
| 90° | 27.6 | 1.18 | 23.4 | 32.5 | 28.1 | 1.18 | 23.8 | 33.3 |
| 105° | 27.7 | 1.18 | 23.5 | 32.6 | 28.2 | 1.18 | 23.8 | 33.4 |
| 120° | 27.5 | 1.18 | 23.4 | 32.4 | 28.2 | 1.18 | 23.8 | 33.4 |
| 135° | 27.4 | 1.18 | 23.3 | 32.2 | 28.0 | 1.18 | 23.7 | 33.0 |
| 150° | 27.4 | 1.18 | 23.3 | 32.2 | 27.8 | 1.18 | 23.6 | 32.8 |
| 165° | 27.4 | 1.18 | 23.3 | 32.2 | 27.6 | 1.18 | 23.5 | 32.5 |

| | C | | | | D | | | |
|---|---|---|---|---|---|---|---|---|
| | Average of Slope | L2/L1 | ÷ | × | Average of Slope | L2/L1 | ÷ | × |
| 0° | 27.4 | 1.17 | 23.3 | 32.2 | 27.4 | 1.17 | 23.3 | 32.2 |
| 15° | 27.1 | 1.17 | 23.1 | 31.8 | 27.4 | 1.17 | 23.3 | 32.2 |
| 30° | 27.2 | 1.17 | 23.2 | 31.9 | 27.5 | 1.18 | 23.4 | 32.3 |
| 45° | 27.2 | 1.17 | 23.2 | 32.0 | 27.6 | 1.18 | 23.4 | 32.5 |
| 60° | 27.3 | 1.18 | 23.2 | 32.1 | 27.7 | 1.18 | 23.5 | 32.7 |
| 75° | 27.5 | 1.18 | 23.4 | 32.4 | 27.9 | 1.18 | 23.6 | 33.0 |
| 90° | 27.7 | 1.18 | 23.5 | 32.7 | 27.9 | 1.18 | 23.6 | 33.0 |
| 105° | 27.8 | 1.18 | 23.6 | 32.8 | 27.8 | 1.18 | 23.5 | 32.8 |
| 120° | 27.8 | 1.18 | 23.6 | 32.8 | 27.5 | 1.18 | 23.4 | 32.4 |
| 135° | 27.8 | 1.18 | 23.5 | 32.8 | 27.3 | 1.17 | 23.2 | 32.0 |
| 150° | 27.6 | 1.18 | 23.4 | 32.5 | 27.0 | 1.17 | 23.1 | 31.6 |
| 165° | 27.5 | 1.18 | 23.4 | 32.3 | 27.0 | 1.17 | 23.0 | 31.6 |

TABLE 17-continued

| | E | | | |
|---|---|---|---|---|
| | Average of Slope | L2/L1 | ÷ | × |
| 0° | 26.9 | 1.17 | 23.0 | 31.5 |
| 15° | 27.1 | 1.17 | 23.1 | 31.8 |
| 30° | 27.3 | 1.18 | 23.3 | 32.1 |
| 45° | 27.6 | 1.18 | 23.4 | 32.5 |
| 60° | 27.9 | 1.18 | 23.6 | 32.9 |
| 75° | 28.1 | 1.18 | 23.8 | 33.2 |
| 90° | 28.1 | 1.18 | 23.8 | 33.3 |
| 105° | 28.1 | 1.18 | 23.8 | 33.2 |
| 120° | 28.1 | 1.18 | 23.7 | 33.2 |
| 135° | 28.1 | 1.18 | 23.7 | 33.2 |
| 150° | 28.0 | 1.18 | 23.7 | 33.1 |
| 165° | 27.9 | 1.18 | 23.6 | 32.9 |

TABLE 18

| | A | | | | B | | | |
|---|---|---|---|---|---|---|---|---|
| | Average of Slope | L2/L1 | ÷ | × | Average of Slope | L2/L1 | ÷ | × |
| 0° | 25.0 | 1.22 | 20.4 | 30.6 | 24.8 | 1.22 | 20.3 | 30.3 |
| 15° | 24.6 | 1.22 | 20.2 | 30.1 | 24.8 | 1.22 | 20.3 | 30.4 |
| 30° | 24.5 | 1.22 | 20.1 | 30.0 | 24.8 | 1.22 | 20.3 | 30.4 |
| 45° | 24.5 | 1.22 | 20.1 | 30.0 | 24.9 | 1.22 | 20.3 | 30.5 |
| 60° | 24.5 | 1.22 | 20.0 | 29.9 | 24.8 | 1.22 | 20.3 | 30.4 |
| 75° | 24.5 | 1.23 | 20.0 | 30.0 | 24.5 | 1.22 | 20.1 | 30.0 |
| 90° | 24.6 | 1.23 | 20.0 | 30.2 | 25.1 | 1.22 | 20.5 | 30.7 |
| 105° | 24.5 | 1.23 | 20.0 | 30.0 | 24.6 | 1.22 | 20.1 | 30.1 |
| 120° | 24.6 | 1.23 | 20.1 | 30.2 | 24.5 | 1.22 | 20.1 | 30.0 |
| 135° | 24.7 | 1.23 | 20.1 | 30.3 | 24.7 | 1.22 | 20.2 | 30.2 |
| 150° | 24.9 | 1.23 | 20.3 | 30.5 | 24.5 | 1.22 | 20.0 | 29.9 |
| 165° | 24.8 | 1.23 | 20.2 | 30.4 | 24.5 | 1.22 | 20.0 | 29.9 |

| | C | | | | D | | | |
|---|---|---|---|---|---|---|---|---|
| | Average of Slope | L2/L1 | ÷ | × | Average of Slope | L2/L1 | ÷ | × |
| 0° | 24.7 | 1.22 | 20.2 | 30.1 | 25.0 | 1.23 | 20.3 | 30.8 |
| 15° | 24.7 | 1.22 | 20.3 | 30.2 | 25.0 | 1.23 | 20.4 | 30.7 |
| 30° | 25.1 | 1.22 | 20.5 | 30.7 | 24.7 | 1.22 | 20.2 | 30.3 |
| 45° | 25.3 | 1.23 | 20.6 | 31.0 | 25.1 | 1.22 | 20.6 | 30.6 |
| 60° | 25.4 | 1.23 | 20.7 | 31.2 | 24.7 | 1.22 | 20.1 | 30.2 |
| 75° | 25.3 | 1.23 | 20.6 | 31.1 | 24.9 | 1.22 | 20.3 | 30.5 |
| 90° | 25.1 | 1.22 | 20.4 | 30.8 | 24.8 | 1.22 | 20.3 | 30.4 |
| 105° | 24.9 | 1.23 | 20.2 | 30.6 | 24.5 | 1.22 | 20.1 | 30.0 |
| 120° | 25.1 | 1.23 | 20.3 | 30.9 | 24.5 | 1.22 | 20.1 | 30.0 |
| 135° | 25.1 | 1.23 | 20.3 | 31.0 | 24.7 | 1.22 | 20.3 | 30.1 |
| 150° | 25.2 | 1.23 | 20.4 | 31.1 | 24.8 | 1.22 | 20.3 | 30.3 |
| 165° | 25.2 | 1.23 | 20.4 | 31.0 | 24.6 | 1.23 | 20.1 | 30.1 |

| | E | | | |
|---|---|---|---|---|
| | Average of Slope | L2/L1 | ÷ | × |
| 0° | 25.1 | 1.23 | 20.4 | 30.8 |
| 15° | 25.3 | 1.23 | 20.5 | 31.1 |
| 30° | 25.3 | 1.23 | 20.5 | 31.1 |
| 45° | 25.2 | 1.23 | 20.4 | 31.1 |
| 60° | 25.3 | 1.23 | 20.5 | 31.3 |
| 75° | 25.2 | 1.23 | 20.5 | 31.1 |
| 90° | 25.3 | 1.23 | 20.5 | 31.1 |
| 105° | 25.3 | 1.23 | 20.5 | 31.1 |
| 120° | 25.4 | 1.23 | 20.6 | 31.3 |
| 135° | 25.4 | 1.23 | 20.6 | 31.2 |
| 150° | 25.4 | 1.23 | 20.6 | 31.2 |
| 165° | 25.2 | 1.23 | 20.5 | 30.8 |

TABLE 19

|  | Haze (%) | av. slope | Lratio | θ ave/Lr | θ ave * Lr |
|---|---|---|---|---|---|
| Example6 | 93.4 | 35.4 | 1.33 | 26.6 | 47.1 |
| Example7 | 90.2 | 27.6 | 1.18 | 23.4 | 32.5 |
| Example8 | 83.2 | 24.9 | 1.23 | 20.3 | 30.5 |

As shown in Tables 16-18, in the light control films (6)-(8), variance of both average of absolute values of slope and length ratio were small at all measurement points and in all directions, thus indicating the presence of uniform unevenness characteristics on the as a whole. Haze of 80% or higher was obtained in all Examples.

Then, the light control films (6)-(8) were incorporated into an edge-light backlight as shown in FIG. 14, and a luminance distribution (emergent angle distribution) at the horizontal direction of ±45° and vertical direction of ±45° was measured. Results obtained in the measurements at 5 positions A-E, corresponding to the surface geometry measurement points, are shown in Tables 20-22. The unit of the figures (luminance) in the tables is cd/m². Distributions of luminance in the horizontal and vertical directions at the point C of the backlight according to embodiment 1 are shown in FIG. 16.

TABLE 20

|  |  | A | B | C | D | E |
|---|---|---|---|---|---|---|
| Horizontal | L45° | 977 | 960 | 1090 | 977 | 964 |
| Direction x | L30° | 1860 | 1840 | 2010 | 1850 | 1830 |
|  | 0° | 2110 | 2130 | 2310 | 2130 | 2120 |
|  | R30° | 1840 | 1860 | 2020 | 1850 | 1870 |
|  | R45° | 960 | 979 | 1090 | 969 | 983 |
| Vertical | U45° | 949 | 950 | 1140 | 1430 | 1420 |
| Direction y | U30° | 1740 | 1730 | 2080 | 2540 | 2530 |
|  | 0° | 2110 | 2130 | 2310 | 2130 | 2120 |
|  | D30° | 2530 | 2530 | 2060 | 1740 | 1750 |
|  | D45° | 1430 | 1430 | 1150 | 960 | 950 |

TABLE 21

|  |  | A | B | C | D | E |
|---|---|---|---|---|---|---|
| Horizontal | L45° | 1210 | 1210 | 1320 | 1190 | 1210 |
| Direction x | L30° | 1620 | 1620 | 1830 | 1610 | 1620 |
|  | 0° | 1840 | 1830 | 2120 | 1840 | 1840 |
|  | R30° | 1620 | 1600 | 1850 | 1610 | 1610 |
|  | R45° | 1220 | 1210 | 1330 | 1220 | 1200 |
| Vertical | U45° | 1200 | 1210 | 1480 | 2380 | 2380 |
| Direction y | U30° | 1700 | 1710 | 2180 | 2850 | 2870 |
|  | 0° | 1840 | 1830 | 2120 | 1840 | 1840 |
|  | D30° | 2860 | 2860 | 2210 | 1710 | 1710 |
|  | D45° | 2380 | 2380 | 1460 | 1210 | 1210 |

TABLE 22

|  |  | A | B | C | D | E |
|---|---|---|---|---|---|---|
| Horizontal | L45° | 985 | 971 | 1070 | 970 | 961 |
| Direction x | L30° | 1650 | 1620 | 1830 | 1650 | 1630 |
|  | 0° | 1790 | 1790 | 2010 | 1790 | 1780 |
|  | R30° | 1620 | 1640 | 1820 | 1630 | 1640 |
|  | R45° | 961 | 986 | 1080 | 959 | 972 |
| Vertical | U45° | 988 | 975 | 1200 | 1780 | 1790 |
| Direction y | U30° | 1560 | 1550 | 2070 | 2760 | 2750 |
|  | 0° | 1790 | 1790 | 2010 | 1790 | 1780 |
|  | D30° | 2770 | 2750 | 2070 | 1540 | 1540 |
|  | D45° | 1790 | 1790 | 1200 | 977 | 979 |

As the results in FIG. 16 indicate, the light control film of Examples could attain a high luminance within 40° and produced an emergent light equal to or higher than that attained by a prism sheet in the front direction.

Comparative Examples 1-4

For commercially available prism sheets (Comparative example 1) and light diffusion sheets (Comparative examples 2-4), the geometry of the rough surface patterned surface (light emergent surface) was measured on 5 points A-E on the film as in abovementioned examples 1-5, and the average of absolute values of slope ($\theta_{ave}$) of the profile curve was obtained. Results obtained in the measurements at 5 points A-E on each light control film in Comparative examples 1-4 are shown in this order in Tables 23-26.

TABLE 23

|  | A | | | | B | | | |
|---|---|---|---|---|---|---|---|---|
|  | Average of Slope | L2/L1 | ÷ | × | Average of Slope | L2/L1 | ÷ | × |
| 0° | 0.2 | 1.00 | 0.2 | 0.2 | 0.4 | 1.00 | 0.4 | 0.4 |
| 15° | 11.4 | 1.03 | 11.1 | 11.7 | 11.8 | 1.03 | 11.5 | 12.2 |
| 30° | 22.5 | 1.12 | 20.1 | 25.2 | 22.8 | 1.13 | 20.2 | 25.8 |
| 45° | 32.0 | 1.23 | 26.0 | 39.4 | 31.7 | 1.22 | 26.0 | 38.7 |
| 60° | 38.9 | 1.32 | 29.5 | 51.3 | 38.6 | 1.32 | 29.2 | 51.0 |
| 75° | 43.3 | 1.38 | 31.4 | 59.8 | 43.7 | 1.39 | 31.4 | 60.7 |
| 90° | 44.7 | 1.41 | 31.7 | 63.0 | 45.0 | 1.41 | 31.9 | 63.5 |
| 105° | 43.4 | 1.39 | 31.2 | 60.3 | 43.7 | 1.40 | 31.2 | 61.2 |
| 120° | 39.0 | 1.31 | 29.8 | 51.1 | 39.3 | 1.32 | 29.8 | 51.9 |
| 135° | 32.1 | 1.22 | 26.3 | 39.2 | 31.5 | 1.21 | 26.0 | 38.1 |
| 150° | 22.8 | 1.13 | 20.2 | 25.8 | 22.4 | 1.12 | 20.0 | 25.1 |
| 165° | 11.2 | 1.03 | 10.9 | 11.5 | 11.3 | 1.04 | 10.9 | 11.8 |

|  | C | | | | D | | | |
|---|---|---|---|---|---|---|---|---|
|  | Average of Slope | L2/L1 | ÷ | × | Average of Slope | L2/L1 | ÷ | × |
| 0° | 0.2 | 1.00 | 0.2 | 0.2 | 0.3 | 1.00 | 0.3 | 0.3 |
| 15° | 11.7 | 1.03 | 11.4 | 12.1 | 11.5 | 1.03 | 11.2 | 11.8 |
| 30° | 22.2 | 1.12 | 19.8 | 24.9 | 22.3 | 1.13 | 19.7 | 25.2 |
| 45° | 32.2 | 1.22 | 26.4 | 39.3 | 31.6 | 1.21 | 26.1 | 38.2 |
| 60° | 39.2 | 1.33 | 29.5 | 52.1 | 38.6 | 1.32 | 29.2 | 51.0 |
| 75° | 43.3 | 1.39 | 31.2 | 60.2 | 43.8 | 1.40 | 31.3 | 61.3 |
| 90° | 45.1 | 1.42 | 31.8 | 64.0 | 44.7 | 1.41 | 31.7 | 63.0 |
| 105° | 43.5 | 1.39 | 31.3 | 60.5 | 43.5 | 1.39 | 31.3 | 60.5 |
| 120° | 38.7 | 1.32 | 29.3 | 51.1 | 38.5 | 1.31 | 29.4 | 50.4 |
| 135° | 31.4 | 1.20 | 26.2 | 37.7 | 31.3 | 1.22 | 25.7 | 38.2 |
| 150° | 22.9 | 1.13 | 20.3 | 25.9 | 22.1 | 1.11 | 19.9 | 24.5 |
| 165° | 11.5 | 1.03 | 11.2 | 11.8 | 11.5 | 1.03 | 11.2 | 11.8 |

|  | E | | | |
|---|---|---|---|---|
|  | Average of Slope | L2/L1 | ÷ | × |
| 0° | 0.1 | 1.00 | 0.1 | 0.1 |
| 15° | 12.0 | 1.02 | 11.8 | 12.2 |
| 30° | 22.0 | 1.12 | 19.6 | 24.6 |
| 45° | 31.6 | 1.22 | 25.9 | 38.6 |
| 60° | 39.3 | 1.33 | 29.5 | 52.3 |
| 75° | 43.3 | 1.39 | 31.2 | 60.2 |
| 90° | 44.6 | 1.41 | 31.6 | 62.9 |
| 105° | 43.7 | 1.39 | 31.4 | 60.7 |
| 120° | 39.2 | 1.32 | 29.7 | 51.7 |
| 135° | 31.9 | 1.23 | 25.9 | 39.2 |
| 150° | 22.2 | 1.12 | 19.8 | 24.9 |
| 165° | 11.7 | 1.03 | 11.4 | 12.1 |

TABLE 24

| | A | | | | B | | | |
|---|---|---|---|---|---|---|---|---|
| | Average of Slope | L2/L1 | ÷ | × | Average of Slope | L2/L1 | ÷ | × |
| 0° | 13.3 | 1.05 | 12.7 | 13.9 | 12.7 | 1.04 | 12.2 | 13.2 |
| 15° | 12.6 | 1.04 | 12.1 | 13.2 | 11.7 | 1.04 | 11.3 | 12.1 |
| 30° | 13.2 | 1.04 | 12.6 | 13.7 | 11.7 | 1.04 | 11.3 | 12.2 |
| 45° | 13.3 | 1.05 | 12.7 | 13.9 | 13.2 | 1.04 | 12.6 | 13.8 |
| 60° | 12.8 | 1.05 | 12.2 | 13.4 | 12.8 | 1.04 | 12.2 | 13.4 |
| 75° | 12.9 | 1.04 | 12.4 | 13.4 | 12.5 | 1.04 | 12.0 | 13.0 |
| 90° | 12.6 | 1.04 | 12.1 | 13.1 | 13.2 | 1.05 | 12.6 | 13.8 |
| 105° | 12.8 | 1.04 | 12.2 | 13.3 | 13.4 | 1.05 | 12.8 | 14.1 |
| 120° | 12.2 | 1.04 | 11.7 | 12.7 | 12.0 | 1.04 | 11.6 | 12.5 |
| 135° | 13.0 | 1.04 | 12.5 | 13.6 | 12.8 | 1.04 | 12.3 | 13.4 |
| 150° | 12.4 | 1.04 | 12.0 | 12.9 | 13.1 | 1.05 | 12.5 | 13.7 |
| 165° | 13.0 | 1.04 | 12.5 | 13.6 | 12.4 | 1.04 | 11.9 | 12.9 |

| | C | | | | D | | | |
|---|---|---|---|---|---|---|---|---|
| | Average of Slope | L2/L1 | ÷ | × | Average of Slope | L2/L1 | ÷ | × |
| 0° | 12.6 | 1.04 | 12.1 | 13.1 | 12.2 | 1.04 | 11.7 | 12.6 |
| 15° | 13.2 | 1.05 | 12.6 | 13.8 | 12.7 | 1.04 | 12.2 | 13.3 |
| 30° | 12.7 | 1.04 | 12.2 | 13.2 | 13.3 | 1.05 | 12.7 | 13.9 |
| 45° | 12.4 | 1.04 | 12.0 | 12.9 | 13.5 | 1.05 | 12.9 | 14.2 |
| 60° | 13.3 | 1.04 | 12.7 | 13.9 | 13.0 | 1.04 | 12.5 | 13.6 |
| 75° | 12.1 | 1.04 | 11.7 | 12.6 | 13.3 | 1.05 | 12.7 | 13.9 |
| 90° | 13.2 | 1.05 | 12.6 | 13.8 | 12.5 | 1.04 | 12.0 | 13.1 |
| 105° | 12.8 | 1.05 | 12.2 | 13.4 | 12.4 | 1.04 | 11.9 | 12.9 |
| 120° | 13.1 | 1.04 | 12.6 | 13.7 | 12.4 | 1.04 | 11.9 | 12.9 |
| 135° | 13.3 | 1.04 | 12.7 | 13.9 | 11.7 | 1.04 | 11.3 | 12.1 |
| 150° | 13.2 | 1.05 | 12.7 | 13.8 | 11.8 | 1.04 | 11.4 | 12.3 |
| 165° | 12.6 | 1.04 | 12.1 | 13.1 | 13.1 | 1.04 | 12.5 | 13.7 |

| | E | | | |
|---|---|---|---|---|
| | Average of Slope | L2/L1 | ÷ | × |
| 0° | 12.8 | 1.04 | 12.2 | 13.3 |
| 15° | 13.0 | 1.04 | 12.4 | 13.5 |
| 30° | 12.7 | 1.04 | 12.2 | 13.2 |
| 45° | 12.7 | 1.04 | 12.2 | 13.3 |
| 60° | 12.8 | 1.04 | 12.3 | 13.4 |
| 75° | 12.2 | 1.04 | 11.7 | 12.7 |
| 90° | 13.3 | 1.04 | 12.7 | 13.9 |
| 105° | 13.1 | 1.05 | 12.5 | 13.7 |
| 120° | 12.5 | 1.04 | 12.0 | 13.1 |
| 135° | 12.4 | 1.04 | 12.0 | 12.9 |
| 150° | 13.2 | 1.04 | 12.6 | 13.7 |
| 165° | 13.3 | 1.04 | 12.7 | 13.9 |

TABLE 25

| | A | | | | B | | | |
|---|---|---|---|---|---|---|---|---|
| | Average of Slope | L2/L1 | ÷ | × | Average of Slope | L2/L1 | ÷ | × |
| 0° | 5.6 | 1.01 | 5.6 | 5.7 | 5.2 | 1.01 | 5.2 | 5.3 |
| 15° | 5.9 | 1.01 | 5.8 | 5.9 | 5.2 | 1.01 | 5.2 | 5.2 |
| 30° | 5.4 | 1.01 | 5.4 | 5.5 | 5.7 | 1.01 | 5.6 | 5.8 |
| 45° | 5.5 | 1.01 | 5.4 | 5.5 | 5.4 | 1.01 | 5.4 | 5.5 |
| 60° | 5.7 | 1.01 | 5.7 | 5.8 | 5.6 | 1.01 | 5.5 | 5.6 |
| 75° | 5.3 | 1.01 | 5.3 | 5.4 | 5.4 | 1.01 | 5.3 | 5.4 |
| 90° | 5.7 | 1.01 | 5.6 | 5.7 | 5.7 | 1.01 | 5.6 | 5.7 |
| 105° | 5.8 | 1.01 | 5.8 | 5.9 | 5.6 | 1.01 | 5.5 | 5.6 |
| 120° | 5.7 | 1.01 | 5.6 | 5.8 | 5.6 | 1.01 | 5.5 | 5.6 |
| 135° | 5.8 | 1.01 | 5.7 | 5.8 | 5.6 | 1.01 | 5.5 | 5.7 |
| 150° | 5.1 | 1.01 | 5.0 | 5.1 | 5.7 | 1.01 | 5.7 | 5.8 |
| 165° | 5.5 | 1.01 | 5.4 | 5.5 | 5.7 | 1.01 | 5.7 | 5.8 |

TABLE 25-continued

| | C | | | | D | | | |
|---|---|---|---|---|---|---|---|---|
| | Average of Slope | L2/L1 | ÷ | × | Average of Slope | L2/L1 | ÷ | × |
| 0° | 5.7 | 1.01 | 5.6 | 5.7 | 5.7 | 1.01 | 5.6 | 5.7 |
| 15° | 5.8 | 1.01 | 5.8 | 5.9 | 5.6 | 1.01 | 5.5 | 5.6 |
| 30° | 5.6 | 1.01 | 5.6 | 5.7 | 5.4 | 1.01 | 5.3 | 5.4 |
| 45° | 5.5 | 1.01 | 5.5 | 5.6 | 5.4 | 1.01 | 5.3 | 5.4 |
| 60° | 5.2 | 1.01 | 5.2 | 5.2 | 4.9 | 1.01 | 4.9 | 5.0 |
| 75° | 5.7 | 1.01 | 5.6 | 5.7 | 4.7 | 1.01 | 4.7 | 4.8 |
| 90° | 5.5 | 1.01 | 5.5 | 5.6 | 5.4 | 1.01 | 5.3 | 5.4 |
| 105° | 5.7 | 1.01 | 5.7 | 5.8 | 5.8 | 1.01 | 5.7 | 5.8 |
| 120° | 5.9 | 1.01 | 5.8 | 6.0 | 5.5 | 1.01 | 5.4 | 5.5 |
| 135° | 5.5 | 1.01 | 5.5 | 5.6 | 5.4 | 1.01 | 5.4 | 5.5 |
| 150° | 5.4 | 1.01 | 5.4 | 5.5 | 5.7 | 1.01 | 5.6 | 5.7 |
| 165° | 5.4 | 1.01 | 5.3 | 5.4 | 5.1 | 1.01 | 5.1 | 5.2 |

| | E | | | |
|---|---|---|---|---|
| | Average of Slope | L2/L1 | ÷ | × |
| 0° | 5.3 | 1.01 | 5.3 | 5.4 |
| 15° | 5.6 | 1.01 | 5.5 | 5.7 |
| 30° | 5.2 | 1.01 | 5.1 | 5.2 |
| 45° | 5.5 | 1.01 | 5.5 | 5.6 |
| 60° | 5.5 | 1.01 | 5.5 | 5.6 |
| 75° | 5.8 | 1.01 | 5.7 | 5.8 |
| 90° | 5.4 | 1.01 | 5.3 | 5.4 |
| 105° | 5.2 | 1.01 | 5.1 | 5.2 |
| 120° | 5.4 | 1.01 | 5.3 | 5.4 |
| 135° | 5.1 | 1.01 | 5.0 | 5.1 |
| 150° | 5.8 | 1.01 | 5.7 | 5.8 |
| 165° | 5.1 | 1.01 | 5.1 | 5.1 |

TABLE 26

| | A | | | | B | | | |
|---|---|---|---|---|---|---|---|---|
| | Average of Slope | L2/L1 | ÷ | × | Average of Slope | L2/L1 | ÷ | × |
| 0° | 19.8 | 1.10 | 17.8 | 21.5 | 19.8 | 1.10 | 18.0 | 21.7 |
| 15° | 19.0 | 1.10 | 17.4 | 20.8 | 19.3 | 1.10 | 17.6 | 21.2 |
| 30° | 19.2 | 1.10 | 17.5 | 21.0 | 19.3 | 1.10 | 17.6 | 21.2 |
| 45° | 19.1 | 1.09 | 17.4 | 20.9 | 19.0 | 1.09 | 17.4 | 20.8 |
| 60° | 19.8 | 1.10 | 18.0 | 21.8 | 19.7 | 1.10 | 17.9 | 21.7 |
| 75° | 19.1 | 1.10 | 17.4 | 20.9 | 19.2 | 1.10 | 17.5 | 21.0 |
| 90° | 19.5 | 1.10 | 17.8 | 21.5 | 19.4 | 1.10 | 17.7 | 21.3 |
| 105° | 19.5 | 1.10 | 17.7 | 21.4 | 19.6 | 1.10 | 17.8 | 21.6 |
| 120° | 19.1 | 1.09 | 17.4 | 20.9 | 19.8 | 1.10 | 18.0 | 21.7 |
| 135° | 19.4 | 1.10 | 17.7 | 21.3 | 19.5 | 1.10 | 17.7 | 21.5 |
| 150° | 19.5 | 1.10 | 17.7 | 21.4 | 18.9 | 1.09 | 17.3 | 20.7 |
| 165° | 19.4 | 1.10 | 17.7 | 21.3 | 19.5 | 1.10 | 17.8 | 21.5 |

| | C | | | | D | | | |
|---|---|---|---|---|---|---|---|---|
| | Average of Slope | L2/L1 | ÷ | × | Average of Slope | L2/L1 | ÷ | × |
| 0° | 19.3 | 1.10 | 17.6 | 21.1 | 19.2 | 1.10 | 17.5 | 21.0 |
| 15° | 19.2 | 1.10 | 17.5 | 21.0 | 19.9 | 1.10 | 18.1 | 22.0 |
| 30° | 19.3 | 1.10 | 17.6 | 21.1 | 18.9 | 1.09 | 17.3 | 20.7 |
| 45° | 19.4 | 1.10 | 17.7 | 21.4 | 19.5 | 1.10 | 17.7 | 21.4 |
| 60° | 19.6 | 1.10 | 17.8 | 21.6 | 19.6 | 1.10 | 17.8 | 21.6 |
| 75° | 19.4 | 1.10 | 17.7 | 21.4 | 19.7 | 1.10 | 17.9 | 21.7 |
| 90° | 19.4 | 1.10 | 17.7 | 21.3 | 19.7 | 1.10 | 17.9 | 21.7 |
| 105° | 19.4 | 1.10 | 17.7 | 21.4 | 19.3 | 1.10 | 17.7 | 21.2 |
| 120° | 19.4 | 1.10 | 17.7 | 21.4 | 19.8 | 1.10 | 17.9 | 21.8 |
| 135° | 19.4 | 1.10 | 17.7 | 21.3 | 19.6 | 1.10 | 17.8 | 21.5 |
| 150° | 19.8 | 1.10 | 18.0 | 21.9 | 19.6 | 1.10 | 17.8 | 21.6 |
| 165° | 19.5 | 1.10 | 17.7 | 21.4 | 19.5 | 1.10 | 17.8 | 21.5 |

TABLE 26-continued

| | E | | | |
|---|---|---|---|---|
| | Average of Slope | L2/L1 | ÷ | × |
| 0° | 20.3 | 1.11 | 18.3 | 22.5 |
| 15° | 19.6 | 1.10 | 17.9 | 21.6 |
| 30° | 19.3 | 1.10 | 17.7 | 21.2 |
| 45° | 18.8 | 1.09 | 17.2 | 20.6 |
| 60° | 19.0 | 1.09 | 17.4 | 20.8 |
| 75° | 19.3 | 1.10 | 17.6 | 21.2 |
| 90° | 19.4 | 1.10 | 17.6 | 21.3 |
| 105° | 19.0 | 1.10 | 17.4 | 20.9 |
| 120° | 20.3 | 1.11 | 18.4 | 22.4 |
| 135° | 18.9 | 1.09 | 17.4 | 20.7 |
| 150° | 19.0 | 1.09 | 17.4 | 20.8 |
| 165° | 19.0 | 1.09 | 17.4 | 20.8 |

As it is clear from Tables 23-26, the average of absolute values of slope of comparative examples are 20° or higher and 75° or lower in all directions at all measurement points or in some directions at all measurement points.

Then, the light control films of Comparative examples 1-4 were incorporated into a 15-inch edge-light backlight (one cold cathode ray tube each on upper and lower positions) as in examples of embodiment 1-3, and placed on a light guiding plate so that the rough surface patterned surface of the film becomes a light emerging surface to measure a luminance distribution (emergent angle distribution) in horizontal direction ±45° and in vertical direction ±45°. Results measured at points A-E are shown in Tables 27-30. An averages of all measurements ($\theta_{ave}$, Lr, $\theta_{ave}$/Lr, $\theta_{ave}$×Lr) at 5 points A-E are shown together with the values of haze measured by using a haze meter (HGM-2K: Suga Shikenki) in Table 31. The unit of the figures in the table is cd/m². Further, a distribution of luminance in horizontal and vertical directions at point C in the backlight in the Comparative example 1 is shown in FIG. 17.

TABLE 27

| | | A | B | C | D | E |
|---|---|---|---|---|---|---|
| Horizontal Direction | L45° | 2040 | 2030 | 2320 | 2050 | 1980 |
| | L30° | 2170 | 2150 | 2480 | 2150 | 2090 |
| | 0° | 2080 | 2080 | 2380 | 2020 | 2030 |
| | R30° | 2160 | 2160 | 2490 | 2100 | 2140 |
| | R45° | 2020 | 2030 | 2310 | 1970 | 2060 |
| Vertical Direction | U45° | 115 | 111 | 144 | 145 | 153 |
| | U30° | 1600 | 1610 | 2230 | 3240 | 3250 |
| | 0° | 2080 | 2080 | 2380 | 2040 | 2030 |
| | D30° | 3280 | 3270 | 2210 | 1510 | 1510 |
| | D45° | 159 | 156 | 152 | 121 | 117 |

TABLE 28

| | | A | B | C | D | E |
|---|---|---|---|---|---|---|
| Horizontal Direction | L45° | 1190 | 1140 | 1450 | 1190 | 1170 |
| | L30° | 1210 | 1180 | 1450 | 1200 | 1190 |
| | 0° | 1140 | 1130 | 1350 | 1140 | 1130 |
| | R30° | 1190 | 1200 | 1450 | 1200 | 1210 |
| | R45° | 1150 | 1200 | 1450 | 1170 | 1200 |
| Vertical Direction | U45° | 1180 | 1170 | 1790 | 2600 | 2580 |
| | U30° | 1150 | 1150 | 1660 | 1970 | 1960 |
| | 0° | 1140 | 1130 | 1350 | 1140 | 1130 |
| | D30° | 1930 | 1940 | 1620 | 1090 | 1080 |
| | D45° | 2570 | 2580 | 1740 | 1110 | 1120 |

TABLE 29

| | | A | B | C | D | E |
|---|---|---|---|---|---|---|
| Horizontal Direction | L45° | 1100 | 1050 | 1380 | 1110 | 1100 |
| | L30° | 1060 | 1030 | 1290 | 1060 | 1050 |
| | 0° | 997 | 993 | 1190 | 980 | 986 |
| | R30° | 1030 | 1020 | 1290 | 1060 | 1050 |
| | R45° | 1060 | 1060 | 1370 | 1090 | 1120 |
| Vertical Direction | U45° | 1140 | 1130 | 1780 | 2590 | 2630 |
| | U30° | 1020 | 1030 | 1520 | 1740 | 1750 |
| | 0° | 997 | 993 | 1190 | 980 | 986 |
| | D30° | 1700 | 1680 | 1460 | 968 | 973 |
| | D45° | 2510 | 2530 | 1700 | 1060 | 1040 |

TABLE 30

| | | A | B | C | D | E |
|---|---|---|---|---|---|---|
| Horizontal Direction | L45° | 1100 | 1080 | 1300 | 1120 | 1090 |
| | L30° | 1440 | 1400 | 1700 | 1440 | 1410 |
| | 0° | 1480 | 1490 | 1720 | 1470 | 1480 |
| | R30° | 1410 | 1440 | 1700 | 1420 | 1430 |
| | R45° | 1080 | 1110 | 1300 | 1080 | 1120 |
| Vertical Direction | U45° | 1090 | 1080 | 1480 | 2020 | 2010 |
| | U30° | 1370 | 1380 | 1920 | 2340 | 2350 |
| | 0° | 1480 | 1490 | 1720 | 1470 | 1480 |
| | D30° | 2350 | 2340 | 1880 | 1310 | 1300 |
| | D45° | 2000 | 2010 | 1480 | 1030 | 1050 |

TABLE 31

| | Haze | av. slope | Lratio | θ ave/Lr | θ ave * Lr |
|---|---|---|---|---|---|
| Comparative Example 1 | 91.8 | 28.4 | 1.21 | 23.4 | 34.6 |
| Comparative Example 2 | 91.8 | 12.8 | 1.04 | 12.2 | 13.3 |
| Comparative Example 3 | 56.0 | 5.5 | 1.01 | 5.4 | 5.5 |
| Comparative Example 4 | 95.7 | 19.4 | 1.10 | 17.7 | 21.3 |

As the results in Tables 28-30 indicate, a good front luminance could not be attained as compared with that in Examples of the invention (Tables 11-15 and Tables 20-22) when a conventional light diffusion sheet was incorporated in the backlight.

Further, the results in Table 27 show that while the luminance changes greatly depending on direction according to the orientation of unevenness in case of a prism sheet, the light control films in Examples of the invention have a relatively uniform luminance distribution and a proper light diffusion property. Further, as the results in FIG. 16 and FIG. 17 indicate, the light control films of Example of the invention have a high luminance within the angle of 40° and produced emergent light in the front direction equal to or higher than that produced by a prism sheet.

Further, if a prism sheet prepared in the Comparative example and plural number of and light diffusion sheets are incorporated in combination in the backlight, the front luminance equal to that of Examples of the invention maybe obtained. However, this could obviously increase the thickness of the backlight and the associated cost.

As it is evident from aforementioned examples, according to this invention, a light control film with a good front luminance and proper light diffusiveness is provided by making the slope and the geometry of the rough surface patterns on the light control film satisfy a certain relationship. Further, by incorporating such light control film in a backlight, a backlight having a high front luminance without occurrence of glare and interference patterns is provided.

The invention claimed is:

1. A light control film having a rough surface pattern defining, for each cross-section perpendicular to a base plane of the film, a profile curve along an edge contoured by the rough surface pattern, wherein for substantially all cross-sections perpendicular to a base plane of the film the profile curve has an average of absolute values of slope to said base plane $\theta_{ave}$ and has a ratio Lr=L2/L1 of the length L2 of said profile curve to the length L1 of a straight line defined by intersection of said base plane and the cross-section satisfy the following:

$$\theta_{ave} \div Lr \geq 20 \text{ and}$$

$$25 \leq \theta_{ave} \times Lr \leq 60.$$

2. A backlight device comprising a light guiding plate, at least one light source located at an edge thereof, said light guiding plate having a light emergent surface approximately orthogonal to said edge, and a light control film according to claim 1 located on the light emergent surface of said light guiding plate.

3. A backlight device comprising a light control film according to claim 1, a light source, and a light diffusing material between said light source and said light control film.

4. A light control film including a surface layer of a material having a refractive index n, said surface layer having a rough surface pattern defining, for each cross-section perpendicular to a base plane of the film, a profile curve along an edge contoured by the rough surface pattern, wherein for substantially all cross-sections perpendicular to a base plane of the film, the profile curve has an average of absolute values of slope of the profile curve to said base plane $\theta_{ave}$ and has a ratio Lr=L2/L1 of the length L2 of said profile curve to the length L1 of a straight line defined by the intersection of said base plane and the cross sections satisfy the following Formula:

$$\theta_{ave} \div Lr \times n^2 \geq 40 \text{ and}$$

$$50 \leq \theta_{ave} \times Lr \times n^2 \leq 135.$$

5. A backlight device comprising a light guiding plate, at least one light source located at an edge thereof, said light guiding plate having a light emergent surface approximately orthogonal to said edge, and a light control film according to claim 4 located on the light emergent surface of said light guiding plate.

6. A backlight device comprising a light control film according to claim 4, a light source, and a light diffusing material between said light source and said light control film.

* * * * *